US012649144B2

(12) United States Patent (10) Patent No.: US 12,649,144 B2
Dietz et al. (45) Date of Patent: *Jun. 9, 2026

(54) MESOPOROUS CARBON SORBENTS AND RELATED METHODS

(71) Applicants: Schlumberger Technology Corporation, Sugar Land, TX (US); TDA Research, Inc., Golden, CO (US)

(72) Inventors: Steven Dean Dietz, Denver, CO (US); Ambalavanan Jayaraman, Highlands Ranch, CO (US); Gokhan Omer Alptekin, Boulder, CO (US); Matthew Schaefer, Lakewood, CO (US)

(73) Assignees: Schlumberger Technology Corporation, Sugar Land, TX (US); TDA Research, Inc., Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/889,921

(22) Filed: Sep. 19, 2024

(65) Prior Publication Data

US 2026/0077332 A1 Mar. 19, 2026

(51) Int. Cl.
*B01J 20/20* (2006.01)
*B01D 53/04* (2006.01)
*B01J 20/28* (2006.01)
*B01J 20/30* (2006.01)

(52) U.S. Cl.
CPC .............. *B01J 20/20* (2013.01); *B01D 53/04* (2013.01); *B01J 20/28071* (2013.01); *B01J 20/28083* (2013.01); *B01J 20/3078* (2013.01); *B01D 2253/102* (2013.01); *B01D 2257/504* (2013.01)

(58) Field of Classification Search
CPC ................. B01J 20/20; B01J 20/28071; B01J 20/28083; B01J 20/3078; B01D 53/04; B01D 2253/102; B01D 2257/504
See application file for complete search history.

(56) References Cited

U.S. PATENT DOCUMENTS

| | | | | |
|---|---|---|---|---|
| 4,458,022 A | * | 7/1984 | Ohsaki | C01B 32/306 |
| | | | | 502/436 |
| 7,167,354 B2 | | 1/2007 | Dietz et al. | |
| 7,541,312 B2 | | 6/2009 | Dietz et al. | |
| 9,120,079 B1 | | 9/2015 | Dietz et al. | |
| 2021/0187480 A1 | * | 6/2021 | Gebald | B01J 20/3483 |

OTHER PUBLICATIONS

Yu, J. et al., "Simple fabrication of an ordered nitrogen-doped mesoporous carbon with resorcinol-melamine-formaldehyde resin", Microporous and Mesoporous Materials, 2014, vol. 190, pp. 117-1127.

* cited by examiner

*Primary Examiner* — Stuart L Hendrickson
(74) *Attorney, Agent, or Firm* — Kyle R. Miiller

(57) ABSTRACT

A mesoporous carbon sorbent for removal of carbon dioxide from a gaseous material includes a BJH average pore width greater than about 3 nm, and a selectivity of carbon dioxide to nitrogen greater than about 20.00 at about 30° C., a partial pressure of carbon dioxide of about 114 mmHg, and a partial pressure of nitrogen of about 646 mmHg. Related mesoporous carbon sorbents, and methods of forming the carbon sorbents are also disclosed.

9 Claims, 9 Drawing Sheets

MESOPOROUS CARBON SORBENTS AND RELATED METHODS

CROSS REFERENCE TO RELATED APPLICATIONS

N/A.

BACKGROUND

Carbon dioxide emissions are a significant contributor to greenhouse gases. For example, byproducts of fossil fuel combustion include carbon dioxide ($CO_2$) and other greenhouse gas emissions. During the combustion of fossil fuels, such as in electric power plants for the generation of electricity, flue gas from a furnace, boiler, or engine is emitted through one or more stacks to the atmosphere. The flue gas includes one or more pollutants, such as nitrogen, oxygen, water vapor, carbon dioxide, and other pollutants, including sulfur oxides, nitrogen oxides, and particulate matter. Carbon dioxide is also present in natural gas or biogas generated from anaerobic digesters. The $CO_2$ is conventionally removed from such materials to increase the concentration of methane for subsequent use.

Carbon capture and storage (CCS) involves capturing carbon dioxide from large point sources, such as power plants, and storing it underground or using it for other purposes, such as enhanced oil recovery or chemical production. CCS can help reduce greenhouse gas emissions and mitigate climate change. Methods of CCS include $CO_2$ separation from other materials (e.g., post-combustion gases, natural gas, biogas, or other sources), such as by chemical and physical solvent processes, chemical absorption, physical absorption, membrane separation with $CO_2$ selective membranes, and cryogenic methods. However, such methods of $CO_2$ separation are energy intensive. For example, chemical absorption includes absorbing the $CO_2$ in an aqueous solution including an alkanolamine (e.g., monoethanolamine (MEA), diethanolamine (DEA), methyldiethanolamine (MDEA)) to form a $CO_2$-amine complex and subsequently releasing the absorbed $CO_2$ from the $CO_2$-amine complex via steam stripping during a regeneration process. In addition, such systems for $CO_2$ separation require large capital expenses to construct. Chemical and physical solvent processes, physical absorption, membrane separation, and cryogenic methods of separation are also costly.

Other methods of $CO_2$ capture include pressure swing adsorption (PSA) and vacuum swing adsorption (VSA). Such methods use physical adsorbents, such as zeolites, carbon molecular sieves, or activated carbons, for capturing the $CO_2$. However, most adsorbents are not well suited for $CO_2$ capture from gas streams because they do not exhibit a high selectivity of $CO_2$ relative to water vapor, nitrogen, and methane.

BRIEF SUMMARY

In some embodiments, a mesoporous carbon sorbent for removal of carbon dioxide from a gaseous material includes a Barrett-Joyner-Halenda (BJH) average pore width greater than about 3 nm, and a selectivity of carbon dioxide to nitrogen greater than about 20.00 at about 30° C., a partial pressure of carbon dioxide of about 114 mmHg, and a partial pressure of nitrogen of about 646 mmHg.

In some embodiments, a method of forming a mesoporous carbon sorbent includes mixing a nitrogen-containing material with a hydroxylated benzene and an aldehyde in a solvent, polymerizing the hydroxylated benzene and the formaldehyde to form a porous polymer including the nitrogen-containing material, and pyrolyzing the porous polymer to form a mesoporous carbon sorbent having an average pore width greater than about 3 nm.

In some embodiments, a system for removing carbon dioxide from a gaseous material with a carbon sorbent includes a sorbent bed comprising a mesoporous carbon sorbent. The mesoporous carbon sorbent includes at least some nitrogen, a Barrett-Joyner-Halenda (BJH) mesopore pore volume of at least about 0.20 $cm^3$/g, and a BJH average pore width greater than about 3 nm. The mesoporous carbon sorbent exhibits a selectivity of carbon dioxide to nitrogen greater than about 20.00 at about 30° C. and a partial pressure of carbon dioxide of about 114 mmHg. The mesoporous carbon sorbent exhibits a water loading less than about 0.50 weight percent at about 25° C. and a relative humidity of about 25 percent.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2 is a simplified schematic illustrating a non-limiting example structure of a polymer of the carbon sorbent, according to at least one embodiment of the disclosure;

DETAILED DESCRIPTION

Figure 1:
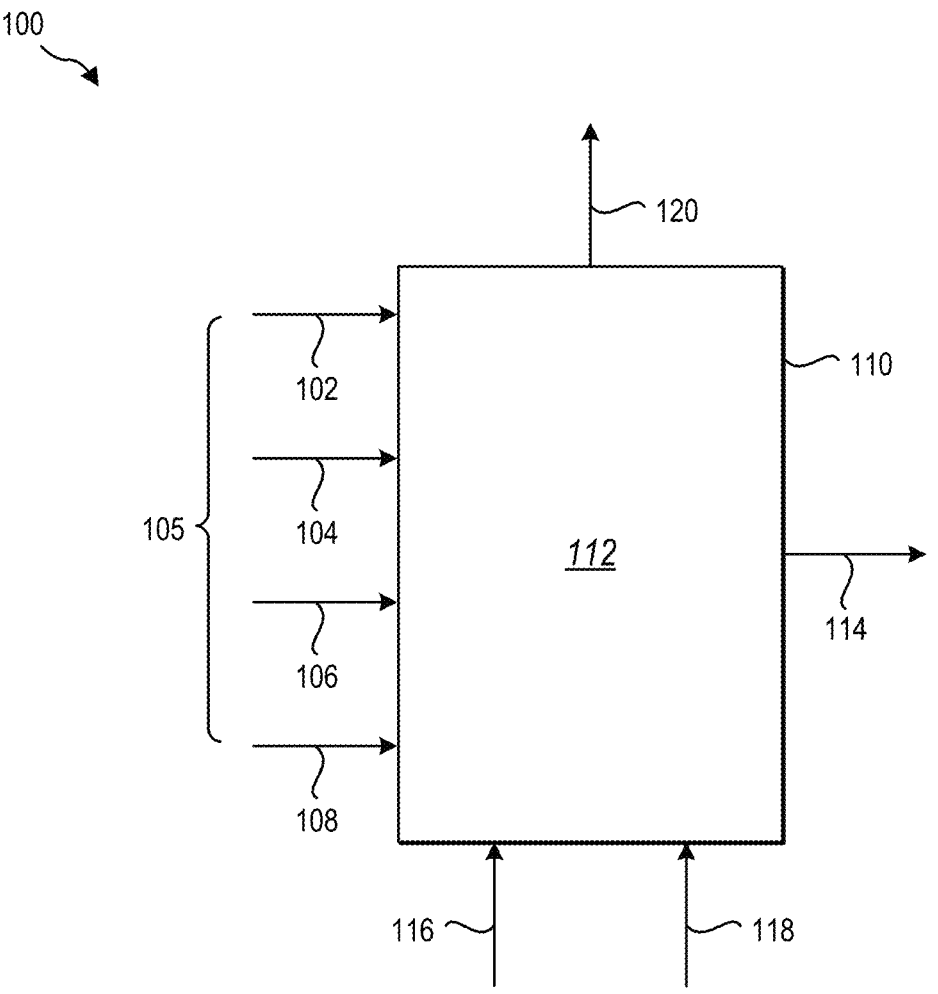
FIG. 1 is a simplified schematic illustrating a system for forming a carbon sorbent, according to at least one embodiment of the present disclosure.

As used herein, a "mesoporous" material means and includes a material having pores including pores having a diameter within a range of from about 2 nm to about 50 nm, according to the International Union of Pure and Applied Chemistry (IUPAC) nomenclature. As used herein a "microporous" material means and includes a material having pores with a diameter smaller than about 2 nm.

This disclosure generally relates to carbon sorbents formulated and configured for physically adsorbing $CO_2$ from one or more gas streams (gaseous materials), such as a post-combustion gas stream (e.g., a flue gas). The carbon sorbent may be formulated and configured to selectively capture $CO_2$ by physical adsorption and may be configured for use in a pressure swing adsorption system or a vacuum swing adsorption system for selectively capturing $CO_2$ from a gas stream, such as a post-combustion gas stream. The carbon sorbent may include a mesoporous carbon material and may be referred to herein as a "mesoporous carbon sorbent."

The carbon sorbent may be formed by pyrolyzing (carbonizing) a polymer formed from a polymerization reaction of one or more hydroxylated benzenes and one or more aldehydes. In some embodiments, the polymer is further formed with one or more nitrogen-containing materials such that the polymer includes nitrogen. A mixture including the one or more hydroxylated benzenes, the one or more aldehydes, a solvent (e.g., water), and optionally, the one or more nitrogen-containing materials, may be formed. In some embodiments, a pH of the mixture may be maintained at a desired pH to control the polymerization of the hydroxylated benzenes, the one or more aldehydes, and the optional nitrogen-containing material. The polymerization may be performed at a temperature of at least about 70° C. After polymerization, the polymer is pyrolyzed (carbonized) to form a mesoporous polymer including the mesoporous carbon sorbent.

The amount of the solvent in the mixture may affect the average pore width (also referred to as the "average pore diameter") of the carbon sorbent. In some embodiments, the average pore width affects the water loading (also referred to as the "water uptake" and corresponding to the amount of water adsorbed) by the carbon sorbent. For example, a relatively larger average pore width may reduce the amount of water adsorbed by the carbon sorbent. In some embodiments, the carbon sorbent includes an average pore width, such as a Barrett-Joyner-Halenda (BJH) pore width, greater than about 3.0 nm, such as greater than about 5.0 nm, greater than about 10.0 nm, or greater than about 20.0 nm. The carbon sorbent may exhibit a BJH mesopore volume greater than about 0.20 $cm^3$/g, such as greater than about 0.40 $cm^3$/g, or greater than about 0.50 $cm^3$/g.

In addition to the average pore width of the carbon sorbent, the atomic percent of the different elements of the carbon sorbent, the distribution thereof, and the types of bonds of the carbon sorbent may affect the adsorption properties of the carbon sorbent. For example, the composition of the surface of the carbon sorbent and/or the types of atomic bonds and molecular structures at the surface of the carbon sorbent, may affect the $CO_2$ capacity (also referred to herein as the "$CO_2$ loading") of the carbon sorbent, the selectivity of the carbon sorbent to $CO_2$ relative to nitrogen gas ($N_2$), the selectivity of the carbon sorbent to $CO_2$ relative to water, and the water loading of the carbon sorbent.

The surface of the carbon sorbent may include carbon atoms, hydrogen atoms, oxygen atoms, and nitrogen atoms. In some embodiments, the surface of the carbon sorbent further includes sulfur atoms and/or phosphorous atoms. The surface of the carbon sorbent may include hydrogen atoms, oxygen atoms, and nitrogen atoms covalently bonded to carbon atoms. In addition, the surface may include hydrogen atoms covalently bonded to hydrogen atoms. The surface may include one or more of (e.g., each of) carbon to oxygen single bonds, carbon to oxygen double bonds, carbon to nitrogen single bonds, and carbon to nitrogen double bonds.

The carbon sorbent may be formulated and configured to exhibit one or more desirable properties with respect to capture of $CO_2$. For example, a selectivity of the carbon sorbent to $CO_2$ relative to $N_2$ may be greater than about 20.00 at 30° C. at a partial pressure of $CO_2$ of about 114 mmHg and a partial pressure of $N_2$ of about 646 mmHg. In addition, the carbon sorbent may exhibit a selectivity of $CO_2$ relative to $N_2$ greater than about 19.00 at 60° C. at a partial pressure of $CO_2$ of about 114 mmHg and a partial pressure of $N_2$ of about 646 mmHg. The carbon sorbent may exhibit a negligible water loading at a relative humidity of 25%, a temperature of about 0° C., and a partial pressure of water of about 1.18 mmHg; and a water loading less than about 0.50 weight percent, such as less than about 0.20 weight percent, at relative humidity of 25%, a temperature of about 25° C., and a partial pressure of water of about 6.09 mmHg.

The relatively high selectivity of the carbon sorbent to $CO_2$ over $N_2$, and the relatively low water capacity of the carbon sorbent, may facilitate improved capture of $CO_2$ compared to other carbon sorbents. For example, the carbon sorbent may selectively capture $CO_2$ compared to $N_2$ and water.

As used herein, and unless specified otherwise, the carbon content, the oxygen content, the nitrogen content, the sulfur content, and the phosphorous content (e.g., the atomic percent of carbon, oxygen, nitrogen, sulfur, and phosphorous) of the carbon sorbent is exclusive of (e.g., does not consider) hydrogen at the surface of the carbon sorbent. In other words, unless specified otherwise, the atomic percent of each of the components of the carbon sorbent (e.g., carbon, oxygen, nitrogen, sulfur, and phosphorus) is exclusive of hydrogen and does not consider the amount of hydrogen in the carbon sorbent. In some such embodiments, the atomic percents of the components of the carbon sorbent are normalized with respect to each other such that the atomic percent of the components exclusive of hydrogen add to 100 atomic percent (even though the carbon sorbent may include hydrogen). Thus, for example, a carbon content (e.g., an atomic percent of carbon) of the carbon sorbent exclusive of hydrogen means and includes the carbon content (e.g., the atomic percent of carbon) of the carbon sorbent when the atomic percent is calculated without consideration of the hydrogen in the carbon sorbent. Similarly, a nitrogen content, an oxygen content, a sulfur content, and a phosphorous content of the carbon sorbent exclusive of hydrogen means and includes the content (e.g., atomic percent) of the respective nitrogen, oxygen, sulfur, and phosphorous of the carbon sorbent when content is calculated without consideration of the hydrogen in the carbon sorbent.

FIG. 1 is a simplified schematic illustrating a system 100 for forming a carbon sorbent 114, according to at least one embodiment of the disclosure. With reference to FIG. 1, the system 100 includes a vessel 110 configured to receive a feed material 105 including a hydroxylated benzene 102, an aldehyde 104, a solvent 106, and optionally, a nitrogen-containing material 108 to form a mixture 112. Components of the mixture 112 may react (e.g., polymerize) in the vessel 110 to form a polymer including a reaction product of one or more components of the mixture 112, such as of the hydroxylated benzene 102, the aldehyde 104, and the nitrogen-containing material 108 (if present).

The vessel 110 may be configured to be sealed and may include, for example, a sealed container. In some embodiments, the vessel 110 includes a mold that is configured to be sealed to reduce (e.g., prevent) evaporation of the feed material 105. The size and shape of the vessel 110 may affect the size and shape of the carbon sorbent 114 formed in the vessel 110. The vessel 110 may be configured to facilitate polymerization of the hydroxylated benzene 102, the aldehyde 104, and the optional nitrogen-containing material 108. The vessel 110 may include a mixer or other means for mixing the components of the feed material 105 such that the mixture 112 includes a substantially homogenous mixture of the components of the feed material 105.

The hydroxylated benzene 102 may include one or more of resorcinol, phenol, catechol, phloroglucinol, aminophenol, hydroquinone, epoxidized phenol, pyrogallol, hydroxyquinol, phloroglucinol, a tetrahydroxybenzene, or another hydroxylated benzene. In some embodiments, the hydroxylated benzene 102 includes resorcinol. In some embodiments, the hydroxylated benzene 102 includes phloroglucinol and resorcinol, hydroquinone and resorcinol, or catechol and resorcinol.

The hydroxylated benzene 102 may be present in the mixture 112 at a weight percent within a range of from about 10.0 weight percent to about 45.0 weight percent of the mixture 112. In other words, the hydroxylated benzene 102 may constitute from about 10.0 weight percent to about 45.0 weight percent of the mixture 112, such as from about 10.0 weight percent to about 20.0 weight percent, from about 20.0 weight percent to about 25.0 weight percent, from about 25.0 weight percent to about 30.0 weight percent, from about 30.0 weight percent to about 35.0 weight percent, from about 35.0 weight percent to about 40.0 weight percent, or from about 40.0 weight percent to about 45.0 weight percent of the mixture 112. The weight percent of the hydroxylated benzene 102 in the mixture 112 may depend, at least in part, on the composition of the feed material 105, such as whether or not the feed material 105 includes the nitrogen-containing material 108. By way of non-limiting example, in embodiments including the nitrogen-containing material 108, the mixture 112 may include a relatively lower weight percent of the hydroxylated benzene 102 than embodiments not including the nitrogen-containing material 108.

The aldehyde 104 may include one or more of formaldehyde, paraformaldehyde, benzaldehyde, glutaraldehyde, glyoxal, or another aldehyde. In some embodiments, the aldehyde 104 includes formaldehyde. In some embodiments, the aldehyde 104 includes paraformaldehyde.

The aldehyde 104 may constitute from about 15.0 weight percent to about 30.0 weight percent of the mixture 112, such as from about 15.0 weight percent to about 20.0 weight percent, from about 20.0 weight percent to about 25.0 weight percent, or from about 25.0 weight percent to about 30.0 weight percent of the mixture 112. The weight percent of the aldehyde 104 in the mixture 112 may depend, at least in part, on the amount of the solvent 106 in the feed material 105.

A molar ratio of the aldehyde 104 to the hydroxylated benzene 102 in the mixture 112 may be within a range of from about 2.0:1.0 to about 7.0:1.0, such as from about 2.0:1.0 to about 3.0:1.0, from about 3.0:1.0 to about 4.0:1.0, from about 4.0:1.0 to about 5.0:1.0, from about 5.0:1.0 to about 6.0:1.0, or from about 6.0:1.0 to about 7.0:1.0. In other words, the mixture 112 may include from about 2.0 moles to about 7.0 moles of the aldehyde 104 for every about 1.0 mole of the hydroxylated benzene 102. The mixture 112 may include greater than about 2.0 moles of the aldehyde for every about 1.0 mole of the hydroxylated benzene 102. In some embodiments, a molar ratio of the aldehyde 104 to the hydroxylated benzene 102 may be about 2.0:1.0. However, the disclosure is not so limited, and the molar ratio of the aldehyde 104 to the hydroxylated benzene 102 may be different than that described. The molar ratio of the aldehyde 104 to the hydroxylated benzene 102 may depend, at least in part, on the composition of the feed material 105, such as whether the feed material 105 includes the nitrogen-containing material 108.

The solvent 106 may include water or an organic solvent, such as one or more of acetone, methanol, ethanol, n-propanol, or isopropanol. In some embodiments, the solvent 106 includes water.

The solvent 106 may constitute from about 40.0 weight percent to about 75.0 weight percent of the mixture 112, such as from about 40.0 weight percent to about 45.0 weight percent, from about 45.0 weight percent to about 50.0 weight percent, from about 50.0 weight percent to about 55.0 weight percent, from about 55.0 weight percent to about 60.0 weight percent, from about 60.0 weight percent to about 65.0 weight percent, from about 65.0 weight percent to about 70.0 weight percent, or from about 70.0 weight percent to about 75.0 weight percent of the mixture 112. In some embodiments, the solvent 106 constitutes from about 40.0 weight percent to about 50.0 weight percent of the mixture 112. However, the disclosure is not so limited, and the weight percent of the solvent 106 in the mixture 112 may be different than that described.

In some embodiments, at least a portion of the solvent 106 is provided to the mixture 112 with the aldehyde 104. For example, in some embodiments, the aldehyde 104 is provided as an aqueous solution including the aldehyde 104 dispersed in a solvent, such as water. In some embodiments, the aldehyde 104 includes formaldehyde and is provided as an aqueous solution including about 37 weight percent formaldehyde in water. In some such embodiments, the solvent 106 may be in addition to the solvent (e.g., water) provided to the mixture 112 with the aldehyde 104.

In some embodiments, forming the mixture 112 to include an excess amount of the solvent 106 may facilitate forming the carbon sorbent 114 to have a relatively larger average pore width than when the carbon sorbent 114 is formed with a lower amount of the solvent 106. In other words, the amount of the solvent 106 may define a size of the pores of the carbon sorbent 114. Without being bound by any particular theory, it is believed that increasing the volume of the solvent 106 in the mixture 112 increases the distance between the neighboring molecules of the hydroxylated benzene 102 and the aldehyde 104 and regions of the polymer formed by the condensation of the hydroxylated benzene 102 and the aldehyde 104. After polymerization, the polymer may be pyrolyzed to form the carbon sorbent 114 having an average pore width based, at least in part, on the amount of the solvent 106 present in the mixture 112.

The nitrogen-containing material 108 may include one or more of melamine, urea, hexamethylenetetramine, an amino acid (e.g., glycine), nitro-aromatic compounds (e.g., nitrophenols), heteroamines (e.g., a triazole, niacin), azo compounds (e.g., 4,4'-azobis(4-cyanopentanoic acid)), ammonium bicarbonate, an amine bicarbonate, ammonium sulfate, ammonium bisulfate, an amine sulfate, an amine bisulfate, ammonium phosphate dibasic, ammonium phosphate, cetyltrimethylammonium bromide, ammonium citrate, ammonium oxalate, ammonium formate, ammonium hydrogen citrate, ammonium hydrogen oxalate, ammonium chloride, ammonium bromide, guanidine carbonate, thiourea, ammonium thiocyanate, or combinations thereof. In some embodiments, the nitrogen-containing material 108 includes, consists essentially of, or consists of one or more of melamine or urea. In some embodiments, the feed material 105 includes a phosphorous-containing material, such as one or more of ammonium phosphate dibasic and/or ammonium phosphate. In some embodiments, the feed material 105 includes a sulfur-containing material, such as one or more of methionine, thiourea, or ammonium thiocyanate.

In embodiments in which the feed material 105 includes the nitrogen-containing material 108, the nitrogen-containing material 108 may constitute from about 1.0 weight percent to about 20.0 weight percent of the mixture 112, such as from about 1.0 weight percent to about 4.0 weight percent, from about 4.0 weight percent to about 6.0 weight percent, from about 6.0 weight percent to about 10.0 weight percent, from about 10.0 weight percent to about 15.0 weight percent, or from about 15.0 weight percent to about 20.0 weight percent of the mixture 112. In some embodiments, the nitrogen-containing material 108 is present in the mixture 112 at a weight percent within a range of from about 4.0 weight percent to about 5.0 weight percent of the mixture 112. In some embodiments, the amount of the nitrogen-containing material 108 in the mixture 112 may affect the average pore width of the carbon sorbent 114. For example, in some embodiments, relatively higher weight percents of the nitrogen-containing material 108 in the mixture 112 may reduce the average pore width of carbon sorbents 114 including the same amount of the solvent 106 but different amounts of the nitrogen-containing material 108.

In some embodiments, the mixture 112 is acidic. The pH of the mixture 112 may be less than about 5.0, such as less than about 4.0, less than about 3.0, or less than about 2.0. In some embodiments, the pH of the mixture 112 is within a range of from about 3.0 to about 4.0. The mixture 112 may include an acid, which may reduce the pH of the mixture 112. The acid may be present in one or both of the aldehyde 104 or the solvent 106. In some embodiments, the aldehyde 104 includes the acid. The acid may include one or more of hydrochloric acid, sulfuric acid, nitric acid, formic acid, or another acid.

In the vessel 110, the hydroxylated benzene 102, the aldehyde 104, and the nitrogen-containing material 108 (if present) may react in a polymerization reaction to form a polymer (e.g., a copolymer, a terpolymer). The polymerization reaction may include a condensation reaction in which monomers of the hydroxylated benzene 102 condense with each other via the hydroxyl groups of the monomers. The condensed hydroxylated benzene 102 structures form clusters or hydroxylated benzene rings in the mixture 112.

The polymerization of the hydroxylated benzene 102 and the aldehyde 104 may occur via a basic route or via an acidic route. In some embodiments, the polymerization occurs via an acidic route in which the aldehyde 104 is protonated, followed by reaction with the hydroxylated benzene 102 to form a hydroxymethyl resorcinol intermediate. The hydroxymethyl resorcinol intermediate polymerizes with another hydroxylated benzene 102 molecule in a condensation reaction to form the polymer.

In some embodiments, the polymerization between the hydroxylated benzene 102 and the aldehyde 104 may be an organic sol-gel process in which the components of the mixture 112 (e.g., the hydroxylated benzene 102, the aldehyde 104, and the nitrogen-containing material 108, if present) polymerize to form a gel.

In some embodiments, the mixture 112 is heated to form a gel and form the polymer. The mixture 112 may be heated to a temperature within a range of from about 70° C. to about 90° C. in an inert atmosphere or in air. During the polymerization reaction, the vessel 110 may be sealed to prevent (or reduce) evaporation of the solvent 106. The inert atmosphere may include, for example, nitrogen gas and/or argon gas. The mixture 112 may be heated for a duration within a range of from about 2 hours to about 24 hours, such as from about 2 hours to about 6 hours, from about 6 hours to about 12 hours, from about 12 hours to about 18 hours, or from about 18 hours to about 24 hours. However, the disclosure is not so limited, and the temperature of the polymerization reaction and the duration thereof may be different than those described.

The polymer may include a novolac type resin or a resol type resin, which may depend on the ratio of the aldehyde 104 to the hydroxylated benzene 102. For example, where the molar ratio of the aldehyde 104 to the hydroxylated benzene 102 is greater than one, a resol resin may be formed; and when the molar ratio of the aldehyde 104 to the hydroxylated benzene 102 is less than one, a novolac resin may be formed. In some embodiments, the polymer includes a resol resin.

Figure 2:
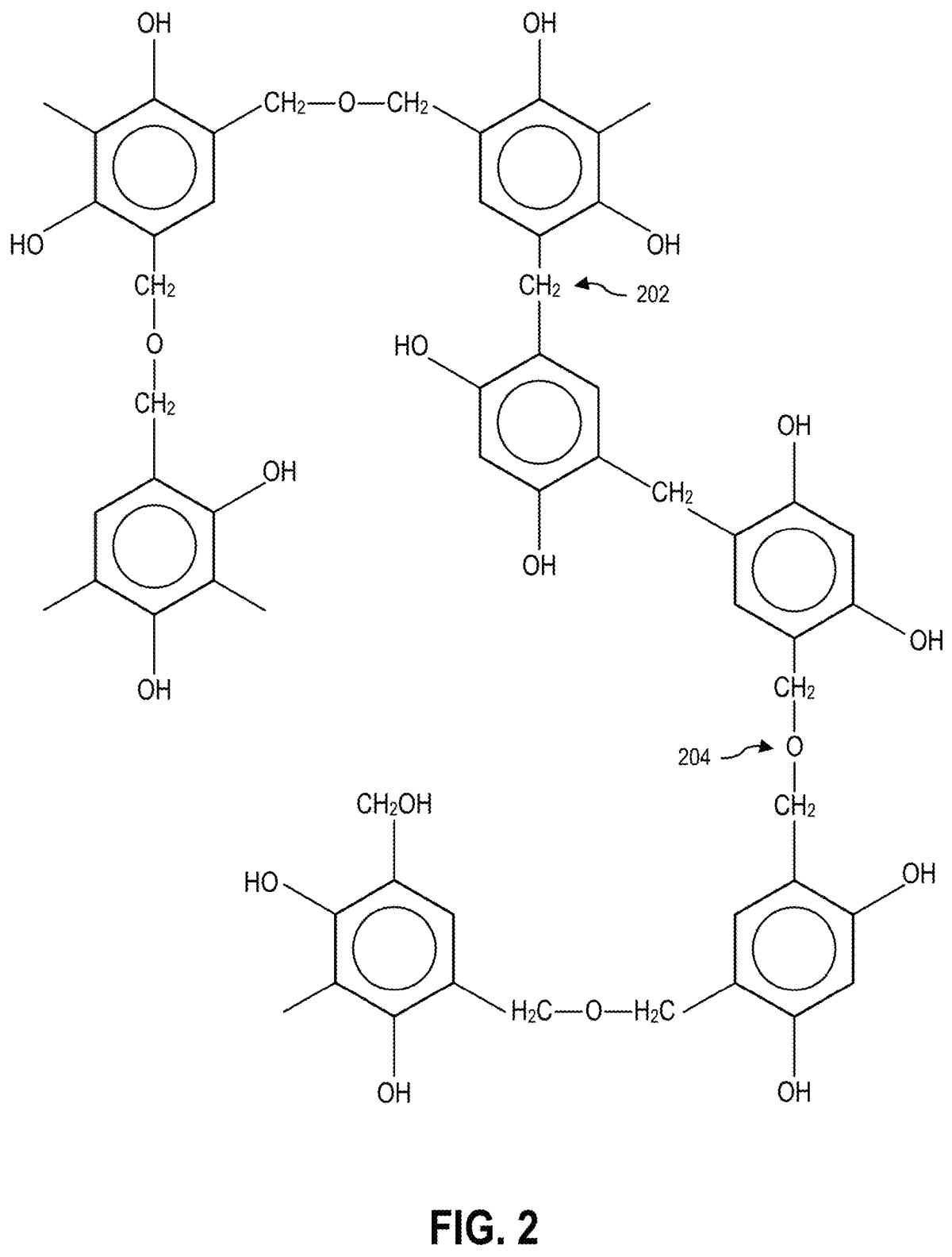

FIG. 2 is a simplified schematic illustrating a non-limiting example structure of the polymer of the carbon sorbent, according to at least one embodiment of the disclosure. The structure of the polymer may be different than that illustrated in FIG. 2. With reference to FIG. 2, the polymer may include methylene bridges 202 and ether bridges 204 between aromatic ring structures.

After forming the polymer, the polymer may be dried to remove the solvent 106 and form a dried polymer. For example, the polymer may be exposed to a drying gas 116 at a temperature of about 110° C. and to remove substantially all of the solvent 106 from the polymer. The drying gas 116 may include, for example, air or another gas.

Referring back to FIG. 1, after removing the solvent 106, the dried polymer may be pyrolyzed. For example, the dried polymer may be exposed to an inert stream 118 and heated to an elevated temperature sufficient to pyrolyze the dried polymer in the vessel 110 and form the carbon sorbent 114 (also referred to as "carbonized carbon sorbent" or a "pyrolyzed carbon sorbent") and volatile materials 120. The dried polymer may be pyrolyzed at a temperature within a range of from about 600° C. to about 950° C., such as from about 600° C. to about 650° C., from about 650° C. to about 700° C., from about 700° C. to about 800° C., from about 800° C. to about 900° C., or from about 900° C. to about 950° C. The dried polymer may be pyrolyzed at a temperature greater than about 600° C., such as greater than about 700° C., or greater than about 800° C. The dried polymer may be exposed to the temperature for from about 2 hours to about 4 hours to pyrolyze the dried polymer and form the carbon sorbent 114.

The inert stream 118 may be substantially free of oxygen. In some embodiments, the inert stream 118 is substantially free of an oxidizer. In some embodiments, the inert stream 118 includes an anoxic material (e.g., the inert stream 118 is substantially free of oxygen, such as oxygen gas ($O_2$)). In some embodiments, the inert stream 118 include a reducing gas, such as hydrogen ($H_2$). The inert stream 118 may include, for example, nitrogen gas, argon, helium, hydrogen, or combinations thereof. In some embodiments, the inert stream 118 includes nitrogen. The volatile materials 120 may include volatile hydrocarbons and at least some decomposition products of the dried polymer that are vaporized in vessel 110.

Responsive to exposure to the elevated temperature, the dried polymer may be pyrolyzed to form the carbon sorbent 114. For example, responsive to exposure to the temperature, the dried polymer may be pyrolyzed to form a char. The carbon sorbent 114 may include mesoporous carbon including pores within a range of from about 2 nm to about 50 nm. The size of the pores may depend on, for example, the composition of the mixture 112, such as the amount of the nitrogen-containing material 108 in the mixture 112, the amount of the solvent 106, or both. A composition of the carbon sorbent 114 may depend, at least in part, on the composition of the feed material 105. In some embodiments, pyrolysis of the dried polymer decomposes the dried polymer and forms a high purity carbon, the composition of which may depend on the composition of the feed material 105.

In some embodiments, the carbon sorbent 114 may be exposed to one or more surface activators at an elevated temperature to increase a surface area of the carbon sorbent 114. The one or more surface activators may include, for example, one or more of steam, carbon dioxide, or oxygen. The carbon sorbent 114 may be exposed to the one or more surface activators in the vessel 110, or may be exposed to the one or more surface activators in another vessel.

The elevated temperature for activating the carbon sorbent 114 and forming the activated carbon sorbent may be within a range of from about 800° C. to about 1,200° C., such as from about 800° C. to about 900° C., from about 900° C. to about 1,000° C., from about 1,000° C. to about 1,100° C., or from about 1,100° C. to about 1,200° C. The temperature of the surface activation may be greater than about 800° C. In some embodiments, the temperature of the surface activation is within a range of from about 900° C. to about 1,000° C.

Although the system 100 has been described and illustrated as forming the polymer, the dried polymer, and the carbon sorbent 114 in the same vessel 110, the disclosure is not so limited. In other embodiments, the polymer may be dried in a different vessel than the vessel 110 in which polymer is formed. In addition, the dried polymer may be carbonized in a different vessel than the vessel in which polymer is dried.

In some embodiments, the carbon sorbent 114 may be exposed to a grinding process to from a powder including the carbon sorbent 114. The powder may be used in a carbon sorbent bed configured to facilitate capture of carbon dioxide from a gaseous stream. In some embodiments, the powder is pelletized to form pellets of the carbon sorbent 114. The powdered and/or pellets may be provided to a carbon sorbent bed.

The carbon sorbent 114 may exhibit a substantially uniform (homogenous) composition. In some embodiments, the surface of the carbon sorbent 114 includes substantially the same composition as other portions of the carbon sorbent 114. The composition of the surface of the carbon sorbent 114 may be measured with, for example, using X-ray photoelectron spectroscopy (XPS). Unless specified otherwise, when describing the composition of the carbon sorbent 114 herein, the composition refers to the composition of the surface of the carbon sorbent 114, which may be the same as the composition throughout the carbon sorbent 114 when the carbon sorbent exhibits a substantially homogenous composition. The carbon sorbent 114 may include carbon atoms covalently bonded to other carbon atoms in ring structures and may further include nitrogen atoms covalently bonded to carbon atoms of the carbon ring structures. In some embodiments, the carbon sorbent 114 comprises, consists essentially of, or consists of carbon atoms, nitrogen atoms, and oxygen atoms.

Figure 3A:
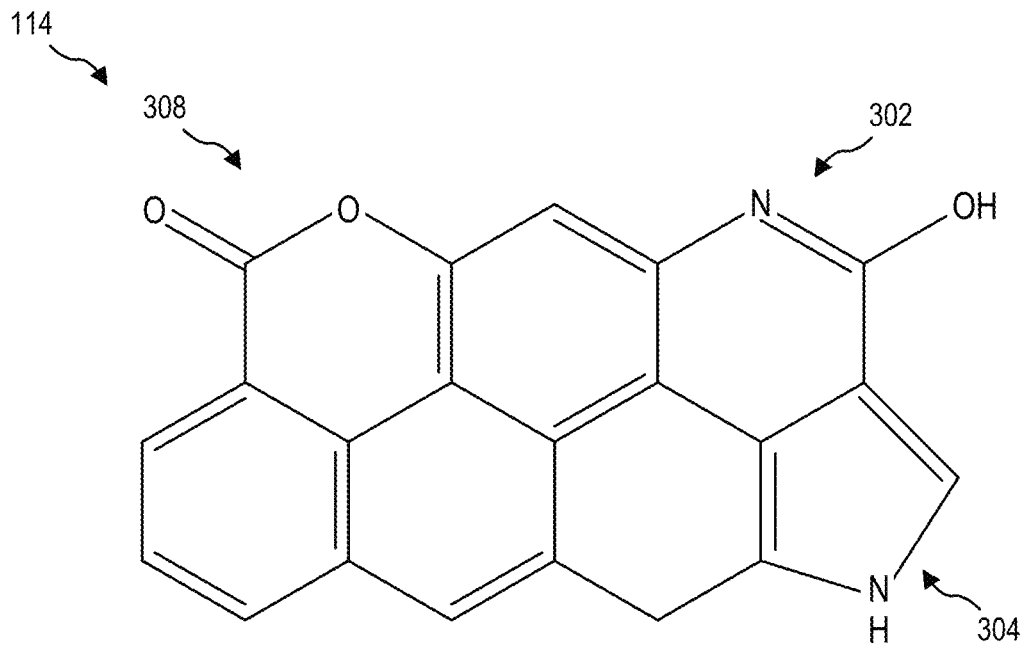
FIG. 3A and FIG. 3B are simplified schematics of non-limiting examples of a structure of carbon sorbents, according to at least one embodiment of the disclosure.
Figure 3B:
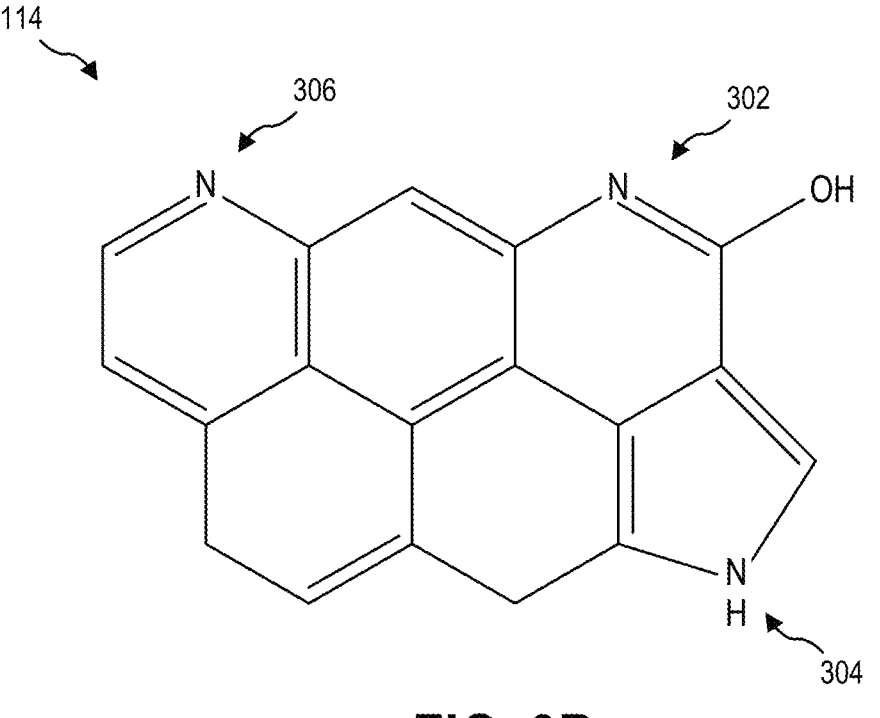

FIG. 3A and FIG. 3B are simplified schematic illustrations of the non-limiting examples of the structure of the carbon sorbent 114, in accordance with at least one embodiment of the disclosure. FIG. 3A and FIG. 3B are non-limiting examples of the structure of the carbon sorbent 114. It will be understood that the structure of the carbon sorbent 114 may be different than those illustrated in FIG. 3A and FIG. 3B. The carbon sorbent 114 may include carbon atoms covalently bonded to other carbon atoms, nitrogen atoms, and/or oxygen atoms. In addition, the carbon sorbent 114 may include nitrogen atoms covalently bonded to carbon atoms, oxygen atoms, or both. In some embodiments, the carbon sorbent 114 includes one or more of (e.g., each of) carbon to carbon single bonds (C—C bonds), carbon to oxygen single bonds (C—O bonds), carbon to nitrogen single bonds (C—N bonds), carbon to oxygen double bonds (C—O bonds) wherein the carbon atom is also single bonded to another oxygen or a nitrogen atom (e.g., O—C—O bonds and/or N—C=O bonds), carbon to hydrogen bonds (C—H bonds), pyridine groups, pyrrole groups, pyrone groups, lactone groups, or combinations thereof. For example, with combined reference to FIG. 3A and FIG. 3B, the carbon sorbent 114 may include pyridone groups or pyridone like structures 302, pyrrole groups 304, pyridine groups 306, and pyrone groups 308. In some embodiments, the carbon sorbent 114 includes each of pyridone groups or pyridone like structures, pyrrole groups, pyridine groups, pyrone groups, and lactone groups. In some embodiments, at least some of the carbon atoms of the carbon sorbent 114 are conjugated and include π-π* bonds.

The carbon sorbent 114 may include carbon atoms covalently bonded to other carbon atoms, nitrogen atoms, hydrogen atoms, and/or oxygen atoms. In addition, the carbon sorbent 114 may include nitrogen atoms covalently bonded to carbon atoms, oxygen atoms, or both. In some embodiments, the carbon sorbent 114 includes one or more of (e.g., each of) carbon to carbon single bonds (C—C bonds), carbon to hydrogen single bonds (C—H bonds), carbon to oxygen single bonds (C—O bonds), carbon to nitrogen single bonds (C—N bonds), carbon to oxygen double bonds (C—O), carbon to nitrogen double bonds (C=N), carbon to oxygen double bonds (C—O bonds) wherein the carbon atom is also single bonded to another oxygen or a nitrogen atom (e.g., O—C=O bonds and/or N—C=O bonds), pyridine groups, pyrrole groups, pyrone groups, lactone groups, or combinations thereof. In some embodiments, at least some of the carbon atoms of the carbon sorbent 114 are conjugated and include π-π* bonds.

A carbon content of the carbon sorbent 114, exclusive of hydrogen atoms in the carbon sorbent 114, may be within a range of from about 86.0 atomic percent to about 95.0 atomic percent, such as from about 86.0 atomic percent to about 88.0 atomic percent, from about 88.0 atomic percent to about 90.0 atomic percent, from about 90.0 atomic percent to about 92.0 atomic percent, from about 92.0 atomic percent to about 94.0 atomic percent, or from about 94.0 atomic percent to about 95.0 atomic percent. However, the disclosure is not so limited, and the carbon content of the carbon sorbent 114 may be different than that described.

An oxygen content of the carbon sorbent 114, exclusive of hydrogen atoms in the carbon sorbent 114, may be within a range of from about 3.0 atomic percent to about 6.0 atomic percent, such as from about 3.0 atomic percent to about 4.0 atomic percent, from about 4.0 atomic percent to about 5.0 atomic percent, or from about 5.0 atomic percent to about 6.0 atomic percent. The oxygen content of the carbon sorbent 114 may be greater than about 3.0 atomic percent, such as greater than about 3.5 atomic percent, greater than about 4.0 atomic percent, greater than about 4.5 atomic percent, or greater than about 5.0 atomic percent.

A nitrogen content of the carbon sorbent 114, exclusive of hydrogen atoms in the carbon sorbent 114, may be within a range of from about 1.0 atomic percent to about 9.0 atomic percent, such as from about 1.0 atomic percent to about 2.0 atomic percent, from about 2.0 atomic percent to about 3.0 atomic percent, from about 3.0 atomic percent to about 4.0 atomic percent, from about 4.0 atomic percent to about 5.0 atomic percent, from about 5.0 atomic percent to about 6.0 atomic percent, from about 6.0 atomic percent to about 7.0 atomic percent, from about 7.0 atomic percent to about 8.0 atomic percent, or from about 8.0 atomic percent to about 9.0 atomic percent. In some embodiments, a nitrogen content of the carbon sorbent 114 is greater than about 1.0 atomic percent, such as greater than about 2.0 atomic percent, greater than about 3.0 atomic percent, greater than about 4.0 atomic percent, greater than about 5.0 atomic percent, greater than about 6.0 atomic percent, or greater than about 7.0 atomic percent.

As described above, the properties of the carbon sorbent 114 may depend, at least in part, on the types of bonds (e.g., carbon bonds) of the carbon sorbent 114. The types and relative amounts of carbon species (and the carbon bonds) at the surface of the carbon sorbent 114 may be determined by XPS. As used herein, carbon bonds of the carbon sorbent 114 may include carbon to hydrogen single bonds (C—H bonds), carbon to carbon single bonds (C—C bonds), carbon to phosphorus single bonds (C—P bonds), carbon to sulfur single bonds (C—S bonds), carbon to oxygen single bonds (C—O bonds), carbon to nitrogen single bonds (C—N bonds), carbon to oxygen double bonds (C=O bonds), carbon to nitrogen double bonds (C=N bonds), carbon to oxygen double bonds wherein the carbon atom is bonded to another oxygen atom (O—C—O bonds), carbon to oxygen double bonds wherein the carbon atom is also bonded to a nitrogen atom (N—C—O bonds), or pi-pi conjugated bonds (and account for carbon to carbon double bonds).

Carbon to hydrogen bonds (C—H), carbon to carbon single bonds (C—C), carbon to sulfur single bonds (C—S), or carbon to phosphorous single bonds (C—P) may constitute from about 45.0 percent to about 65.0 percent of the total number of carbon bonds of the carbon sorbent 114, such as from about 45.0 percent to about 50.0 percent, from about 50.0 percent to about 55.0 percent, from about 55.0 percent to about 60.0 percent, or from about 60.0 percent to about 65.0 percent of the total carbon bonds of the carbon sorbent 114. The percent of carbon bonds in the carbon sorbent 114 that are either carbon to hydrogen or carbon to carbon single bonds may be greater than about 45.0 percent and less than about 65.0 percent in some embodiments.

Carbon to oxygen single bonds (C—O) or carbon to nitrogen single bonds (C—N) may constitute from about 15.0 percent to about 30.0 percent of the total number of carbon bonds of the carbon sorbent 114, such as from about 15.0 percent to about 20.0 percent, from about 20.0 percent to about 25.0 percent, or from about 25.0 percent to about 30.0 percent of the carbon bonds of the carbon sorbent. The percent of carbon bonds in the carbon sorbent 114 that are either carbon to oxygen single bonds or carbon to nitrogen single bonds may be greater than about 15.0 percent and less than about 30.0 percent.

Carbon to oxygen double bonds (C=O) or carbon to nitrogen double bonds (C=N) may constitute from about 8.0 percent to about 12.0 percent of the total number of carbon bonds of the carbon sorbent 114, such as from about 8.0 percent to about 9.0 percent, from about 9.0 percent to about 10.0 percent, from about 10.0 percent to about 11.0 percent, or from about 11.0 percent to about 12.0 percent of the total number of carbon bonds in the carbon sorbent 114. The percent of carbon bonds in the carbon sorbent 114 that are either carbon to oxygen double bonds or carbon to nitrogen double bonds may be greater than about 8.0 percent, such as greater than about 9.0 percent, greater than about 10.0 percent, or greater than about 11.0 percent. By way of non-limiting example, for every about 100 carbon bonds of the carbon sorbent 114, the carbon sorbent 114 may include from about 8 to about 12 carbon to oxygen double bonds and/or carbon to nitrogen double bonds.

Carbon to oxygen double bonds wherein the carbon atom is also single bonded to an oxygen atom (O—C=O) or single bonded to a nitrogen atom (N—C=O) may constitute from about 2.0 percent to about 4.0 percent of the total carbon bonds of the carbon sorbent 114, such as from about 2.0 percent to about 2.5 percent, from about 2.5 percent to about 3.0 percent, from about 3.0 percent to about 3.5 percent, or from about 3.5 percent to about 4.0 percent of the carbon bonds of the carbon sorbent 114. In some embodiments, from about 2.0 percent to about 3.0 percent of the carbon bonds of the carbon sorbent 114 are double bonded to an oxygen atom and single bonded to one of another oxygen atom or a nitrogen atom. By way of non-limiting example, for every about 100 carbon bonds of the carbon sorbent 114, the carbon sorbent 114 may include from about 2 to about 4 carbon atoms that are double bonded to an oxygen atom and also single bonded to one of another oxygen atom or a nitrogen atom. It should be noted that such carbon atoms are exclusive of carbon atoms that are double bonded to an oxygen atom but are not also single bonded to another oxygen atom or a nitrogen atom (e.g., carbon atoms that are double bonded to an oxygen atom and single bonded to another carbon atom).

A percent of the carbon bonds of the carbon sorbent 114 that exhibit π-π* conjugation may be within a range of from about 9.0 percent to about 12.0 percent of the total number of carbon bonds, such as from about 9.0 percent to about 10.0 percent, from about 10.0 percent to about 11.0 percent, or from about 11.0 percent to about 12.0 percent. In some embodiments, the percent of the carbon bonds in the carbon sorbent 114 that exhibit π-π* conjugation may be within a range of from about 9.0 percent and about 10.0 percent. The π-π* conjugation may be indicative of the presence of graphite-like carbon bonding, which occurs only when there is sufficient π-bond conjugation to allow for π and π* orbitals to form in a sufficiently large area. Without being bound by any particular theory, it is believed that the carbon atoms exhibiting the π bond conjugation include one or both of pyrone and pyridone groups. The π electrons of the pyrone and the amine groups may enhance the basicity of the surface of the carbon sorbent 114, increasing the adsorption of $CO_2$ by the carbon sorbent 114.

Oxygen to carbon double bonds ($C=O$ bonds) may constitute from about 20.0 percent to about 40.0 percent of the total number of oxygen bonds of the carbon sorbent 114, such as from about 20.0 percent to about 25.0 percent, from about 25.0 percent to about 30.0 percent, from about 30.0 percent to about 35.0 percent, or from about 35.0 percent to about 40.0 percent of the oxygen bonds of the carbon sorbent 114. In some embodiments, from about 25.0 atomic percent to about 35.0 percent of the oxygen bonds of the carbon sorbent 114 are double bonded to a carbon atom. A percent of the oxygen bonds in the carbon sorbent 114 that are oxygen to carbon single bonds (C—O bonds) may be within a range of from about 60.0 percent to about 80.0 percent of the total number of oxygen bonds of the carbon sorbent 114, such as from about 60.0 percent to about 65.0 percent, from about 65.0 percent to about 70.0 percent, from about 70.0 percent to about 75.0 percent, or from about 75.0 percent to about 80.0 percent of the oxygen bonds of the carbon sorbent 114. In some embodiments, greater than about 70.0 percent of the oxygen bonds of the carbon sorbent 114 are oxygen to carbon single bonds.

In some embodiments, a ratio of the combination of pyridone groups and pyrrole groups to pyridine groups (e.g., the ratio of pyridone/pyrrole to pyridine) in the carbon sorbent 114 may be within a range of from about 1.0:1.0 to about 1.0:1.5, such as from about 1.0:1.0 to about 1.0:1.25, or from about 1.0:1.25 to about 1.0:1.5. In some embodiments, the carbon sorbent 114 includes a greater amount of pyridine structures than the combination of pyridone and pyrrole structures.

While the carbon sorbent 114 has been described as having a particular composition, the disclosure is not so limited. In other embodiments, the atomic percent of one or more of carbon, oxygen, nitrogen, sulfur, or phosphorous in the carbon sorbent 114 may be different than those described.

As described above, the carbon sorbent 114 may exhibit one or more properties beneficial for $CO_2$ capture. A specific surface area of the carbon sorbent 114 may be determined by using Brunauer-Emmett-Teller (BET) surface area analysis. The carbon sorbent 114 (whether activated or not) may exhibit a BET surface area within a range of from about 300 $m^2/g$ to about 2,000 $m^2/g$, such as from about 300 $m^2/g$ to about 400 $m^2/g$, from about 400 $m^2/g$ to about 500 $m^2/g$, from about 500 $m^2/g$ to about 600 $m^2/g$, from about 600 $m^2/g$ to about 750 $m^2/g$, from about 750 $m^2/g$ to about 1,000 $m^2/g$, from about 1,000 $m^2/g$ to about 1,250 $m^2/g$, from about 1,250 $m^2/g$ to about 1,500 $m^2/g$, from about 1,500 $m^2/g$ to about 1,750 $m^2/g$, or from about 1,750 $m^2/g$ to about 2,000 $m^2/g$. In some embodiments, the BET surface area of the carbon sorbent 114 is within a range of from about 400 $m^2/g$ to about 750 $m^2/g$, such as from about 450 $m^2/g$ to about 650 $m^2/g$.

A Barrett-Joyner-Halenda (BJH) pore volume of the carbon sorbent 114 may be within a range of from about 0.20 $cm^3/g$ to about 1.10 $cm^3/g$, such as from about 0.20 $cm^3/g$ to about 0.40 $cm^3/g$, from about 0.40 $cm^3/g$ to about 0.60

$cm^3/g$, from about 0.60 $cm^3/g$ to about 0.80 $cm^3/g$, from about 0.80 $g/cm^3$ to about 1.00 $g/cm^3$, or from about 1.00 $g/cm^3$ to about 1.10 $g/cm^3$. In some embodiments, the BJH pore volume is greater than about 0.20 $g/cm^3$, such as greater than about 0.40 $g/cm^3$, greater than about 0.60 $g/cm^3$, greater than about 0.80 $g/cm^3$, or greater than about 1.00 $g/cm^3$. The BJH pore volume may include, consist essentially of, or consist of the micropore volume of the carbon sorbent 114 and may be exclusive of the macropore volume of the carbon sorbent 114.

A t-plot micropore volume determined by BJH analysis of the carbon sorbent 114 may be within a range of from about 0.150 $cm^3/g$ to about 0.300 $cm^3/g$, such as from about 0.150 $cm^3/g$ to about 0.200 $cm^3/g$, from about 0.200 $cm^3/g$ to about 0.250 $cm^3/g$, or from about 0.250 $cm^3/g$ to about 0.300 $cm^3/g$. The t-plot micropore volume may be representative of the total volume of the micropores of the carbon sorbent 114 (and may be exclusive of and not include the mesopore volume).

A total pore volume of the carbon sorbent 114 may include the BJH pore volume and the t-plot micropore volume. The total pore volume of the carbon sorbent may be greater than about 1.10 $cm^3/g$, such as greater than about 1.15 $cm^3/g$, greater than about 1.20 $cm^3/g$, or greater than about 1.25 $cm^3/g$. However, the disclosure is not so limited, and the total pore volume of the carbon sorbent 114 may be different than that described.

A BJH average pore width of the carbon sorbent 114 may be within a range of from about 3.0 nm to about 40.0 nm, such as from about 3.0 nm to about 5.0 nm, from about 5.0 nm to about 10.0 nm, from about 10.0 nm to about 20.0 nm, from about 20.0 nm to about 30.0 nm, or from about 30.0 nm to about 40.0 nm. In some embodiments, the BJH average pore width of the carbon sorbent 114 is greater than about 10.0 nm, such as greater than about 10.0 nm, greater than about 20.0 nm, greater than about 25.0 nm, greater than about 30.0 nm, or greater than about 40.0 nm. In some embodiments, the average pore width of the carbon sorbent 114 is greater than about 50.0 nm, such as greater than about 100 nm. In some embodiments, the BJH average pore width of the carbon sorbent 114 may depend, at least in part, on the amount of the solvent 106 in the mixture 112 used to form the carbon sorbent 114. In some embodiments, the carbon sorbent 114 exhibits a unimodal distribution.

A $CO_2$ loading capacity (also referred to as a "carbon dioxide capacity") of the carbon sorbent 114 may be measured by exposing the carbon sorbent 114 to a gas stream at different temperatures and partial pressures of $CO_2$. For example, the $CO_2$ capacity of the carbon sorbent 114 may be measured by exposing the carbon sorbent 114 to a gas stream including 15 volume percent $CO_2$ and 85 volume percent nitrogen at a total pressure of 760 mmHg. Thus, the gas stream may exhibit a partial pressure of $CO_2$ of about 114 mmHg and a partial pressure of nitrogen of about 646 mmHg. The $CO_2$ capacity of the carbon sorbent 114 at 60° C. and a partial pressure of $CO_2$ of about 114 mmHg may be within a range of from about 1.00 weight percent to about 2.00 weight percent (meaning that the weight of $CO_2$ adsorbed corresponds to from 1.00 weight percent to about 2.00 weight percent of the weight of the carbon sorbent 114; for example, 100 grams of the carbon sorbent 114 may be loaded with from about 1.00 gram to about 2.00 grams of $CO_2$), such as from about 1.00 weight percent to about 1.25 weight percent, from about 1.25 weight percent to about 1.50 weight percent, from about 1.50 weight percent to about 1.75 weight percent, or from about 1.75 weight percent to about 2.00 weight percent. The $CO_2$ capacity of the carbon sorbent 114 at 60° C. and a $CO_2$ partial pressure of about 114 mmHg may be greater than about 1.00 weight percent, such as greater than about 1.25 weight percent, or greater than about 1.50 weight percent.

The $CO_2$ capacity of the carbon sorbent 114 at 30° C. and a $CO_2$ partial pressure of about 114 mmHg may be within a range of from about 3.00 weight percent to about 4.50 weight percent, such as from about 3.00 weight percent to about 3.50 weight percent, from about 3.50 weight percent to about 4.00 weight percent, or from about 4.00 weight percent to about 4.50 weight percent of the carbon sorbent 114. The $CO_2$ capacity of the carbon sorbent 114 at 30° C. and a $CO_2$ partial pressure of about 114 mmHg may be greater than about 3.00 weight percent, such as greater than about 3.50 weight percent of the carbon sorbent 114.

The carbon sorbent 114 may exhibit an Ideal Adsorption Solution Theory (IAST) selectivity of carbon dioxide relative to nitrogen ($N_2$) at 60° C. greater than about 18.00, such as greater than about 20.00, greater than about 21.00, greater than about 22.00, greater than about 23.00, greater than about 24.00, or greater than about 25.00. In some embodiments, the selectivity of the carbon sorbent 114 to $CO_2$ relative to $N_2$ at 60° C. may be at least about 19.00, such as at least about 20.00, at least about 21.00, at least about 22.00, at least about 23.00, or even at least about 24.00. As used herein the selectivity of the carbon sorbent 114 to $CO_2$ relative to $N_2$ at a particular temperature includes the ratio of the mole fractions in the adsorbed state (q) of $CO_2$ to $N_2$ at the partial pressure of each of $CO_2$ and $N_2$. For example, the selectivity of the carbon sorbent 114 to $CO_2$ relative to $N_2$ at a particular temperature may be defined according to Equation (1) below:

$$S = \frac{\dfrac{q_{CO2}}{P_{CO_2}}}{\dfrac{q_{N_2}}{P_{N_2}}}; \quad (1)$$

wherein $q_{CO2}$ is the mole fraction of adsorbed $CO_2$ at the particular temperature; $P_{CO2}$ is the partial pressure of $CO_2$ at which the $CO_2$ is adsorbed; $q_{N2}$ is the mole fraction of adsorbed $N_2$ at the particular temperature; and $P_{N2}$ is the partial pressure of $N_2$ at which the $N_2$ is adsorbed. As used herein, the selectivity of the carbon sorbent 114 to $CO_2$ relative to $N_2$ is measured with a gas including 15 volume percent $CO_2$ and 85 volume percent $N_2$ at a total pressure of 760 mmHg such that the gas has a partial pressure of $CO_2$ of about 114 mmHg and a partial pressure of $N_2$ of about 646 mmHg.

The selectivity of the carbon sorbent 114 to $CO_2$ relative to $N_2$ at 30° C. (and a partial pressure of $CO_2$ of about 114 mmHg and a partial pressure of $N_2$ of about 646 mmHg) may be within a range of from about 20.00 to about 29.00, such as from about 20.00 to about 22.00, from about 22.00 to about 24.00, from about 24.00 to about 26.00, or from about 26.00 to about 29.00. In some embodiments, the selectivity of the carbon sorbent 114 to $CO_2$ relative to $N_2$ at 30° C. is greater than about 20.00, such as greater than about 22.00, greater than about 24.00, or greater than about 26.00.

A difference between the selectivity of the carbon sorbent 114 to $CO_2$ relative to $N_2$ at 30° C. and to $CO_2$ relative to $N_2$ at 60° C. at a partial pressure of $CO_2$ of about 114 mmHg and a partial pressure of $N_2$ of about 646 mmHg may be within a range of from about 0.20 to about 2.00, such as from about 0.20 to about 0.50, from about 0.50 to about 1.00, from about 1.00 to about 1.50, or from about 1.50 to about 2.00. In some embodiments, the difference may be less than about 2.00, such as less than about 1.50, less than about 1.00, or less than about 0.50.

At about 0° C. and a relative humidity of about 25 percent, the carbon sorbent 114 may exhibit a negligible water loading (a finite amount that was not measured during adsorption testing) when the carbon sorbent 114 is exposed to a stream having a partial pressure of water of about 1.18 mmHg. At about 25° C. and a relative humidity of about 25 percent, the carbon sorbent 114 may exhibit a water loading within a range of from about 0.01 weight percent to about 0.50 weight percent of the carbon sorbent 114 when the carbon sorbent 114 is exposed to a stream having a partial pressure of water of about 6.09 mmHg. When exposed to a stream having a partial pressure of water of about 6.09 mmHg at about 25° C. and a relative humidity of about 25 percent, the carbon sorbent 114 may exhibit a water loading less than about 0.50 weight percent, such as less than about 0.25 weight percent, less than about 0.20 weight percent, or less than about 0.10 weight percent of the carbon sorbent 114.

At about 0° C. and a relative humidity of about 50 percent, the carbon sorbent 114 may exhibit a water loading within a range of from about 4.00 weight percent to about 7.00 weight percent of the carbon sorbent 114, such as from about 4.00 weight percent to about 5.00 weight percent, from about 5.00 weight percent to about 6.00 weight percent, or from about 6.00 weight percent to about 7.00 weight percent of the carbon sorbent 114 when the carbon sorbent 114 is exposed to a stream having a partial pressure of water of about 2.36 mmHg. At about 0° C. and a relative humidity of about 50 percent, the carbon sorbent 114 may exhibit a water loading less than about 7.00 weight percent, such as less than about 6.00 weight percent, or less than about 5.00 weight percent of the carbon sorbent 114 when exposed to the stream having a partial pressure of water of about 2.36 mmHg.

At about 25° C. and a relative humidity of about 50 percent, the carbon sorbent 114 may exhibit a water loading within a range of from about 5.00 weight percent to about 8.00 weight percent of the carbon sorbent 114 when the carbon sorbent 114 is exposed to a stream having a partial pressure of water of about 12.17 mmHg. In some embodiments, at about 25° C. and a relative humidity of about 50 percent, the carbon sorbent 114 may exhibit a water loading less than about 7.00 weight percent, such as less than about 6.00 weight percent, or less than about 5.00 weight percent of the carbon sorbent 114 when exposed to the stream having a partial pressure of water of about 12.17 mmHg.

The carbon sorbent 114 may be used in carbon capture systems to capture $CO_2$ from, such as from flue gases at point sources (e.g., power plants, refineries, cement plants, steel plants). For example, the carbon sorbent 114 may be used in pressure swing adsorption (PSA) systems and/or vacuum swing adsorption (VSA) systems. In some embodiments, the carbon sorbent 114 is used in a multi-bed, solid-state sorbent contactor.

Figure 4:
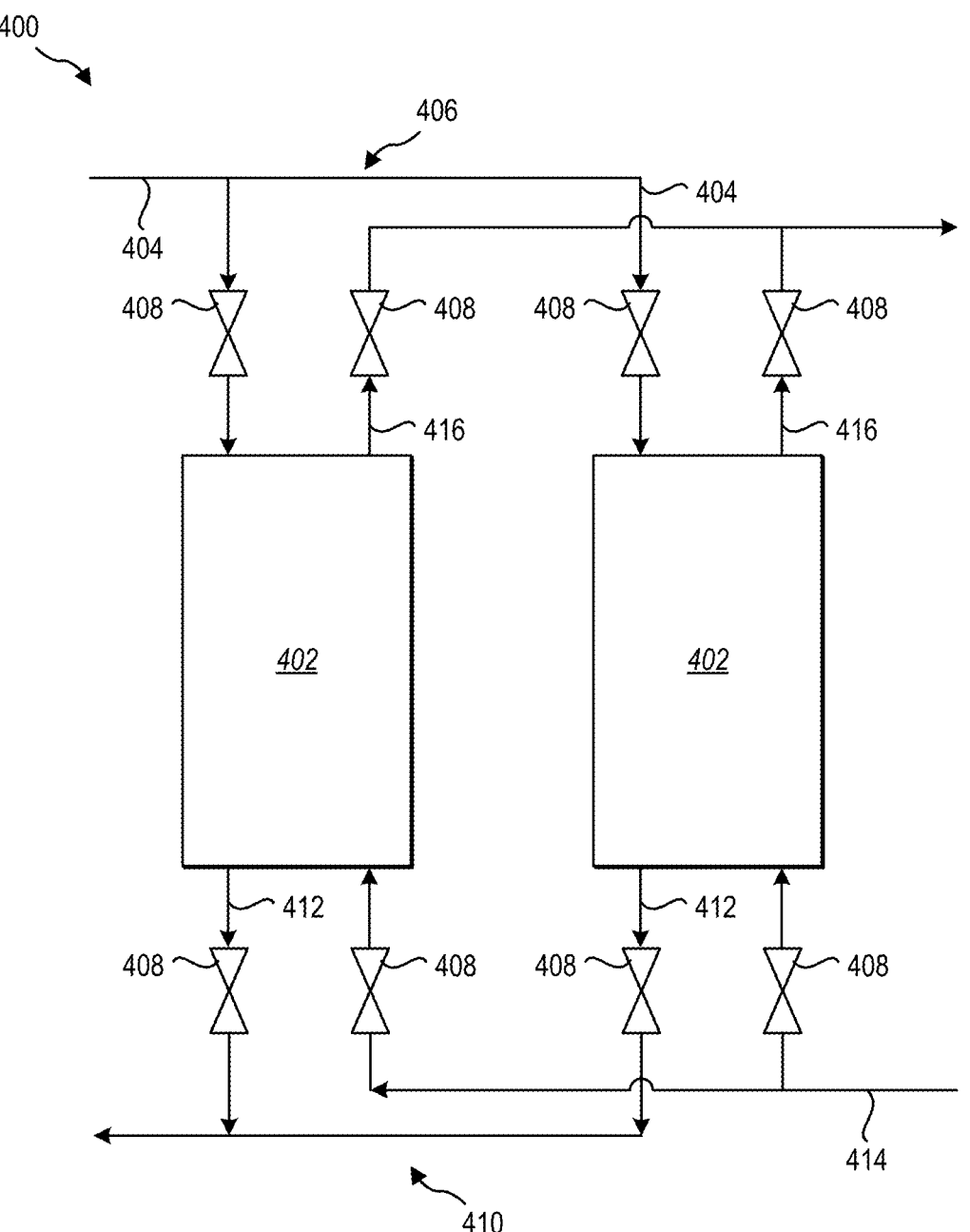
FIG. 4 is a simplified schematic illustrating a system for physically adsorbing carbon dioxide, according to at least one embodiment of the disclosure.

FIG. 4 is a simplified schematic illustrating a system 400 for physically adsorbing carbon dioxide using sorbent beds 402, according to at least one embodiment of the disclosure. Each sorbent bed 402 includes (e.g., is filled, is at least partially filled) a volume of carbon sorbent (e.g., the carbon sorbent 114). The system 400 may be configured to facilitate recovery of $CO_2$ from an inlet stream 404 (also referred to as a "feed stream") including a concentration of $CO_2$. The inlet stream 404 may be provided to an inlet manifold 406, which may include piping and valves 408 configured to selectively provide the inlet stream 404 through one or more desired sorbent beds 402. While FIG. 4 illustrates two sorbent beds 402, the system 400 may include a greater number (e.g., three, four, five, six, etc.) of sorbent beds 402.

With continued reference to FIG. 4, an outlet manifold 410 may include outlets 412 from each of the sorbent beds 402. Each of the outlets 412 may include valves 408 configured to facilitate control of flows out of each of the respective sorbent bends 402. The outlets 412 may include a purified stream including less $CO_2$ than the inlet stream 404 (since the $CO_2$ may be captured by physical adsorption on the carbon sorbent of the sorbent beds 402). In use and operation, the inlet stream 404 may be directed to one or more of the sorbent beds 402 via the valves 408 in fluid communication with the inlet manifold 406. In some embodiments, at least one of the sorbent beds 402 may not be in fluid communication with the inlet manifold 406 (e.g., the valve 408 to the inlet of the sorbent bed 402 may be closed) while at least another of the sorbent beds 402 is in fluid communication with the inlet stream 404. As described in further detail herein, in some such embodiments, the carbon sorbent in the one or more sorbent beds 402 not in fluid communication with the inlet stream 404 may be exposed to a regeneration process while the at least another of the sorbent beds 402 is capturing $CO_2$ from the inlet stream 404.

Each of the sorbent beds 402 may further be configured to be in fluid communication with a regeneration stream 414 through one or more valves 408. The regeneration stream 414 may be configured to flow through the sorbent beds 402 to regenerate the carbon sorbent within the sorbent beds and form a desorption outlet stream 416, which may, for example, be discharged to the atmosphere and/or be condensed and recycled for further recovery. For example, responsive to exposure to the regeneration stream 414, adsorbed $CO_2$ may be desorbed from the carbon sorbent to form the desorption outlet stream 416. The regeneration stream 414 may include, for example, one or more of steam, nitrogen, another material, or combinations thereof. The carbon sorbent in the sorbent beds 402 may be regenerated by exposing the carbon sorbent to one or more of a pressure swing, a concentration swing, a thermal swing, or combinations thereof.

The sorbent beds 402 may each include for example, a fixed bed adsorption bed, such as radial-type bed. The sorbent beds 402 may be operated in either a centripetal manner (wherein the adsorption flow is radially inward) or a centrifugal manner (wherein the adsorption flow is radially outward). The sorbent beds 402 may be configured to support flow of one or more streams in a co-current direction and/or a counter-current direction. In some embodiments, the adsorption and desorption cycle includes adsorption, co-current blow-down, counter-current $CO_2$ recovery/regeneration, and pressurization.

While FIG. 4 has described and illustrated a system 400 including a particular configuration, the disclosure is not so limited, and the carbon sorbent may be used in other systems including different adsorption beds.

Forming the carbon sorbent 114 using the hydroxylated benzene 102, the aldehyde 104, the solvent 106, and optionally, the nitrogen-containing material 108 facilitates forming the carbon sorbent 114 having a desired average pore width and a relatively larger average pore width than other carbon sorbents. For example, the average pore width may be controlled by, for example, increasing the amount of the solvent 106 in the mixture 112. The increased average pore width may decrease the amount of water adsorbed by the carbon sorbent 114 and increase the selectivity of the carbon sorbent 114 to $CO_2$ relative to water.

The carbon sorbent 114 may be advantageous for $CO_2$ recovery. For example, the carbon sorbent 114 according to embodiments of the disclosure may exhibit improved $CO_2$ adsorption capacity, improved selectivity of $CO_2$ relative to water and nitrogen, and reduced water adsorption compared to other carbon sorbents. The particular composition and the types of covalent bonds at the surface of the carbon sorbent 114 facilitate the improved $CO_2$ capture properties (e.g., $CO_2$ capacity, selectivity of $CO_2$) of the carbon sorbent 114.

EXAMPLE

Carbon sorbents were formed with different feed materials including different amounts of resorcinol, formaldehyde, water, and nitrogen-containing materials. The formulations for forming the carbon sorbents are shown in Table 1 below. Carbon sorbents 1-4 were formed with resorcinol, formaldehyde, and water. In addition, carbon sorbents 1-4 were formed with a 2.0:1.0 molar ratio of formaldehyde to resorcinol. Carbon sorbents 5-8 were formed with resorcinol, formaldehyde, water, and either melamine or urea. In Table 1, the ratio of the weight percent of water to the weight percent resorcinol was calculated as the weight percent of water divided by the weight percent of resorcinol. The water included the water present in the solution of formaldehyde and additional water that was added to the feed material.

TABLE 1

| Carbon Sorbent | Resorcinol (wt. %) | Formaldehyde (wt. %) | Nitrogen Compound | Nitrogen Compound (wt. %) | Water (wt. %) | Ratio of wt. % water to wt. % resorcinol |
|---|---|---|---|---|---|---|
| 1 | 40.4 | 22.0 | None | 0 | 37.5 | 0.93 |
| 2 | 35.0 | 19.1 | None | 0 | 45.9 | 1.31 |
| 3 | 32.5 | 17.7 | None | 0 | 49.7 | 1.53 |
| 4 | 29.8 | 16.3 | None | 0 | 53.9 | 1.81 |
| 5 | 29.9 | 22.2 | Melamine | 4.1 | 43.8 | 1.46 |
| 6 | 31.0 | 23.7 | Melamine | 4.9 | 40.4 | 1.30 |
| 7 | 14.5 | 24.3 | Urea | 16.9 | 44.3 | 3.06 |
| 8 | 13.8 | 26.0 | Melamine | 13.1 | 47.1 | 3.41 |

Various properties of the carbon sorbents of Table 1 were measured, as shown in Table 2 below. The measured properties included the BET surface area, the BJH pore volume, the t-plot micropore volume, and the BJH average pore width.

TABLE 2

| Carbon Sorbent | BET Surface Area ($m^2/g$) | BJH Pore Volume ($cm^3/g$) | t-plot micropore volume ($cm^3/g$) | BJH Average Pore Width (nm) |
|---|---|---|---|---|
| 1 | 515 | 0.107 | 0.190 | 4.0 |
| 2 | 649 | 0.347 | 0.200 | 5.6 |
| 3 | 623 | 1.063 | 0.206 | 20.5 |
| 4 | 630 | 1.140 | 0.236 | 31.0 |
| 5 | 612 | 0.820 | 0.220 | 22.0 |
| 6 | 627 | 0.620 | 0.210 | 14.0 |
| 7 | 411 | 0.200 | 0.190 | 3.5 |
| 8 | 489 | 0.220 | 0.230 | 3.4 |

As shown in Table 2, the carbon sorbents that were formed with relatively higher amounts of the nitrogen-containing material included a relatively smaller BJH average pore width. For carbon sorbents 1-4, formed without the nitrogen-containing material, the BJH average pore width increased with an increasing ratio of the weight percent of water to the weight percent of the resorcinol. For carbon sorbents 5-8, which were formed with the nitrogen-containing materials, increasing concentration of the nitrogen-containing materials in the feed material caused the BJH average pore width and the BJH pore volume to decrease. The nitrogen-containing material in the feed material did not appear to affect the t-plot micropore volume of the carbon sorbent.

Figure 5:
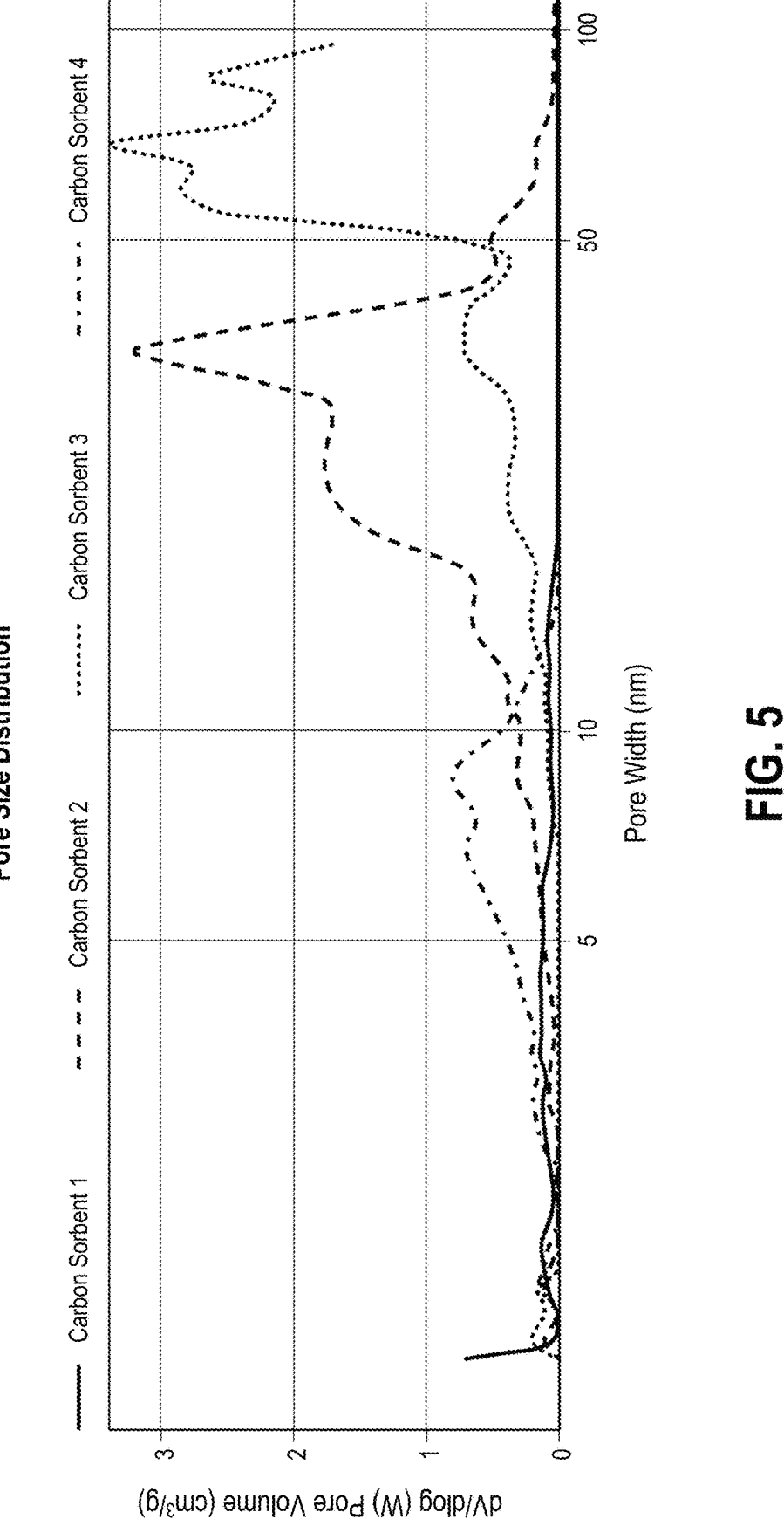
FIG. 5 is a graph illustrating pore size distributions of carbon sorbents formed without a nitrogen-containing material and with different amounts of water.

FIG. 5 is a graph illustrating the pore size distribution of carbon sorbents 1-4. With reference to FIG. 5, each carbon sorbent exhibited a unimodal pore size distribution with each carbon sorbent having a distinct broad peak, wherein the center of the peak increases in pore width with increasing amounts of water in the feed material.

Figure 6:
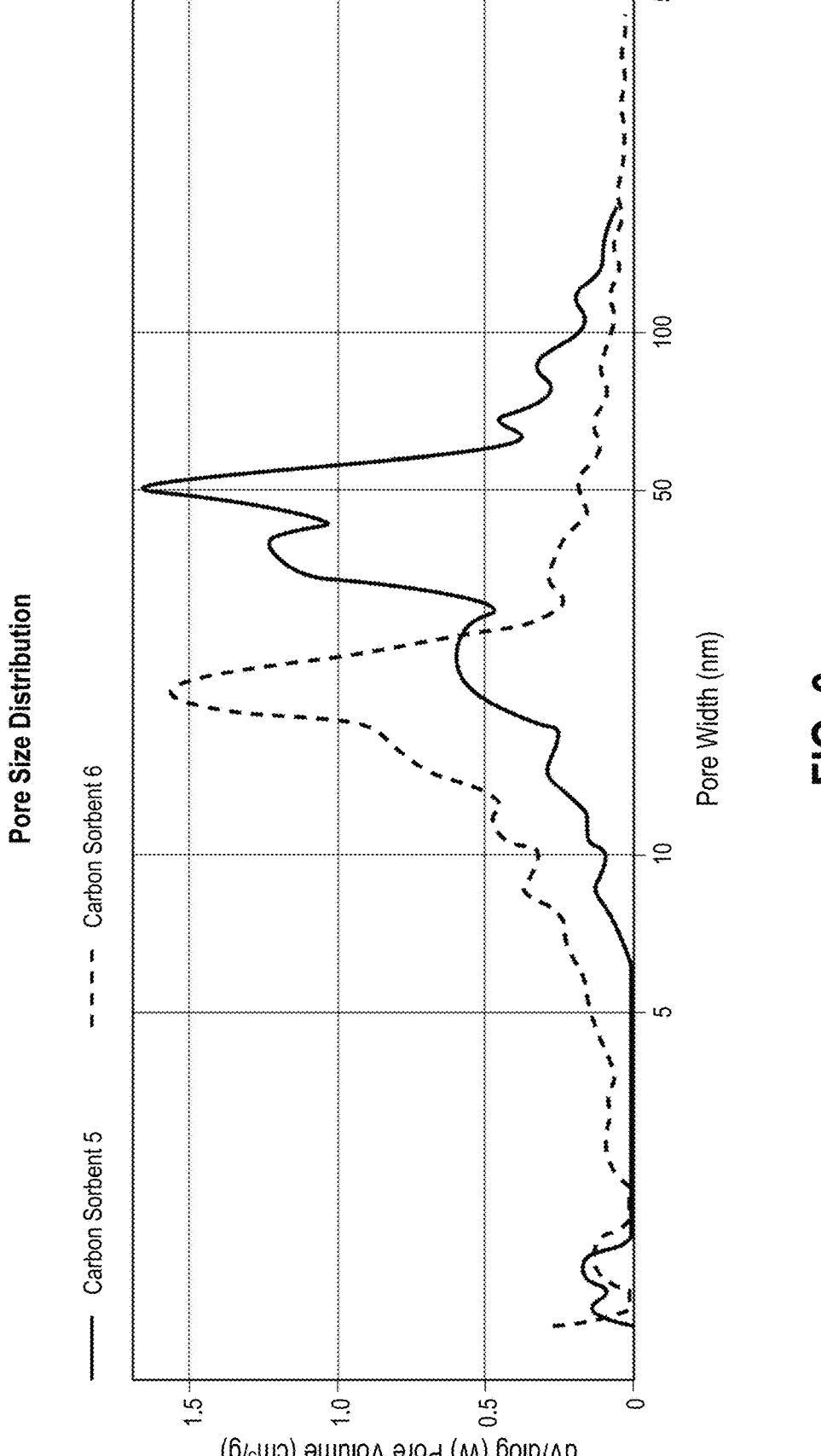
FIG. 6 is a graph illustrating the pore size distributions of carbon sorbents formed with nitrogen-containing materials.

FIG. 6 is a graph illustrating the pore size distribution of carbon sorbents 5 and 6. With reference to FIG. 6, carbon sorbents 5 and 6 exhibited a unimodal particle size distribution. Carbon sorbent 5 was formed with a higher amount of water than carbon sorbent 6 and exhibited a larger average pore width than carbon sorbent 6. Since FIG. 6 includes the derivative of the pore volume on the y-axis, the peak for carbon sorbent 5 appears more intense around 50 nm.

Figure 7:
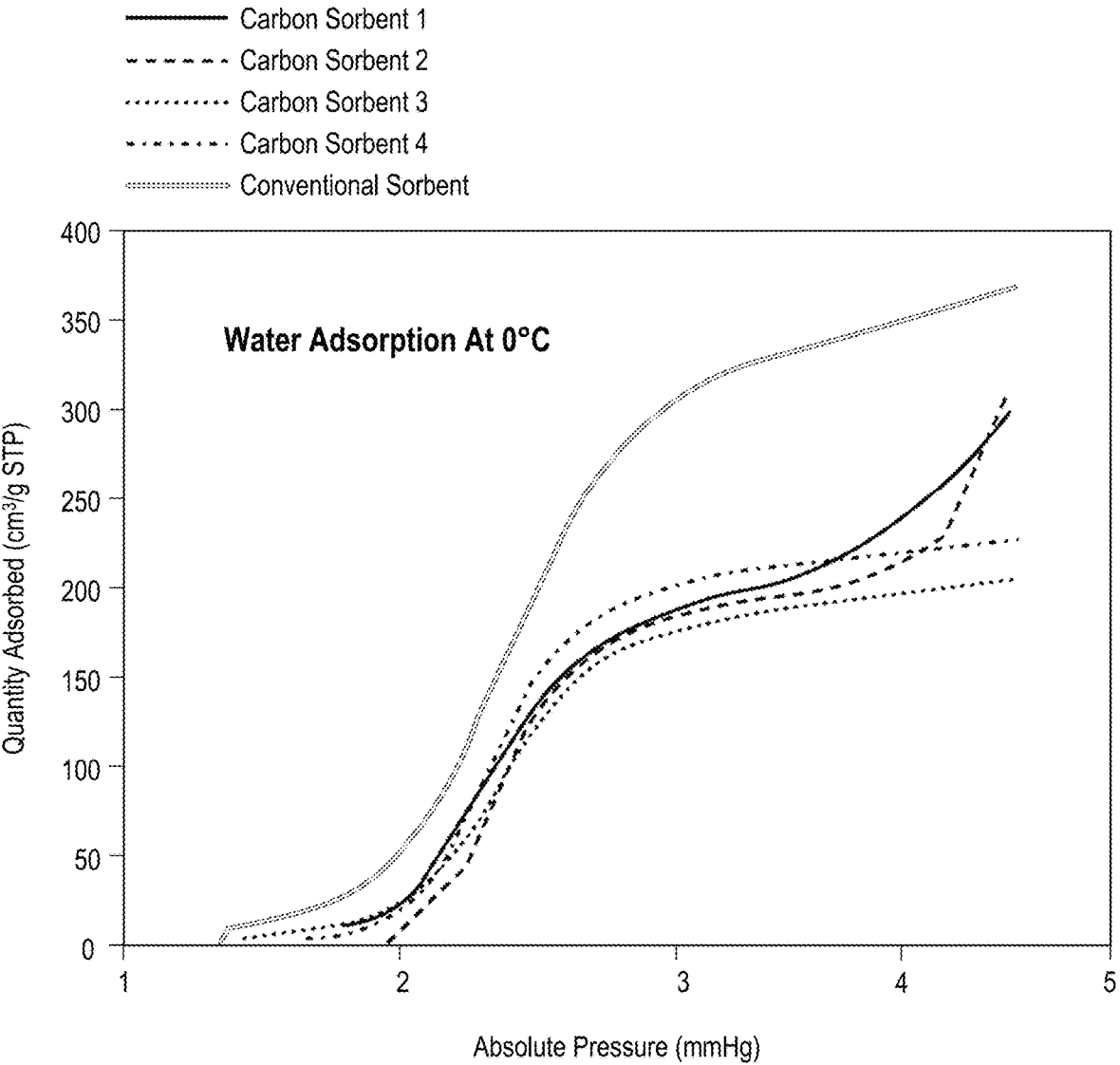
FIG. 7 is a graph illustrating a water adsorption isotherm of various carbon sorbents at 0° C.
Figure 8:
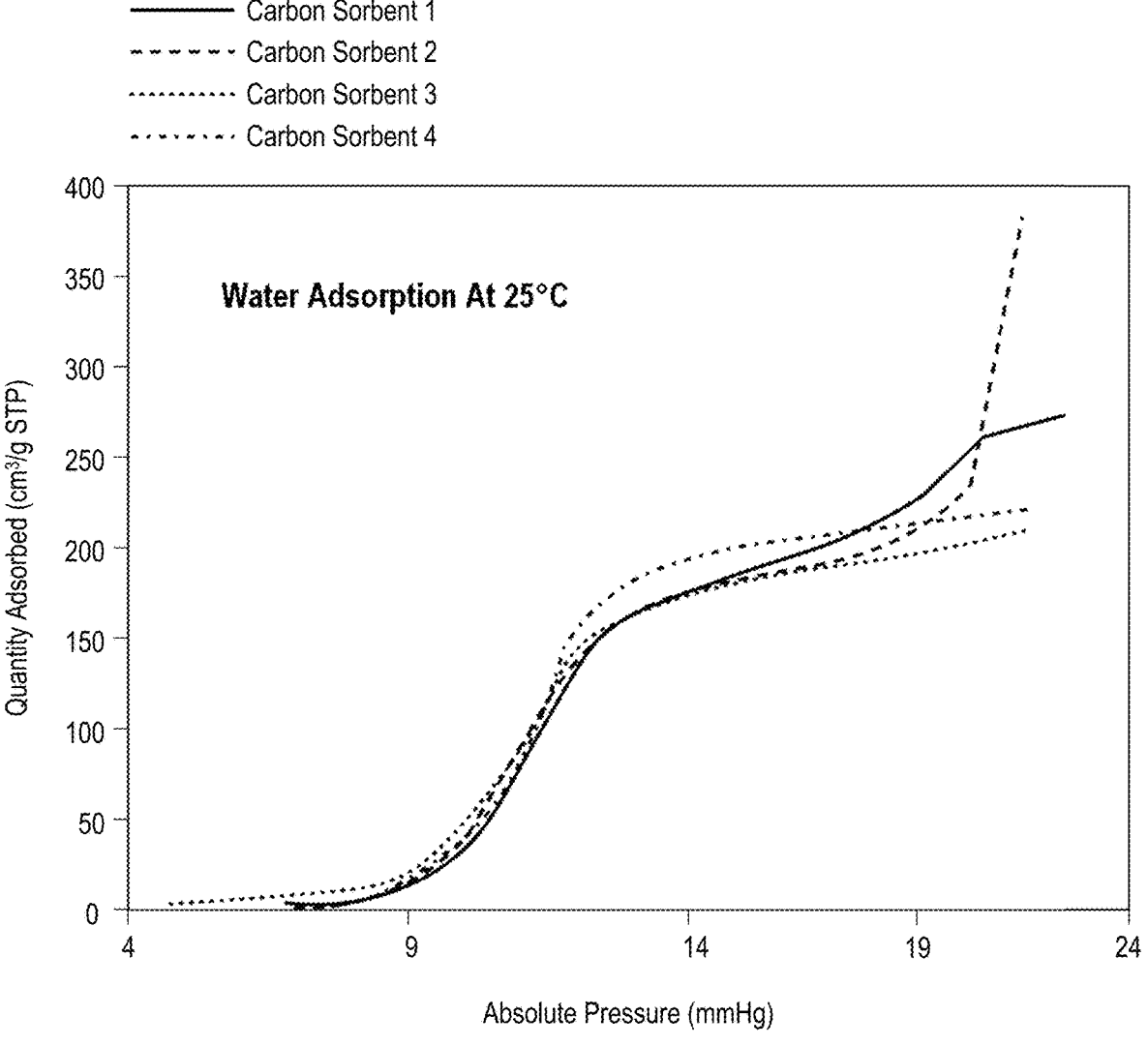
FIG. 8 is a graph illustrating a water adsorption isotherm of carbon sorbents at 25° C.

The water adsorption isotherms for carbon sorbents 1-4 were measured at 0° C. and 25° C. FIG. 7 is a graph illustrating the water adsorption isotherms of the carbon sorbents and a conventional carbon sorbent at 0° C. and FIG. 8 is a graph illustrating the water adsorption isotherms of the carbon sorbents at 25° C. With collective reference to FIG. 7 and FIG. 8, carbon sorbents 1-4 exhibited lower water adsorption than the conventional sorbent.

Figure 9:
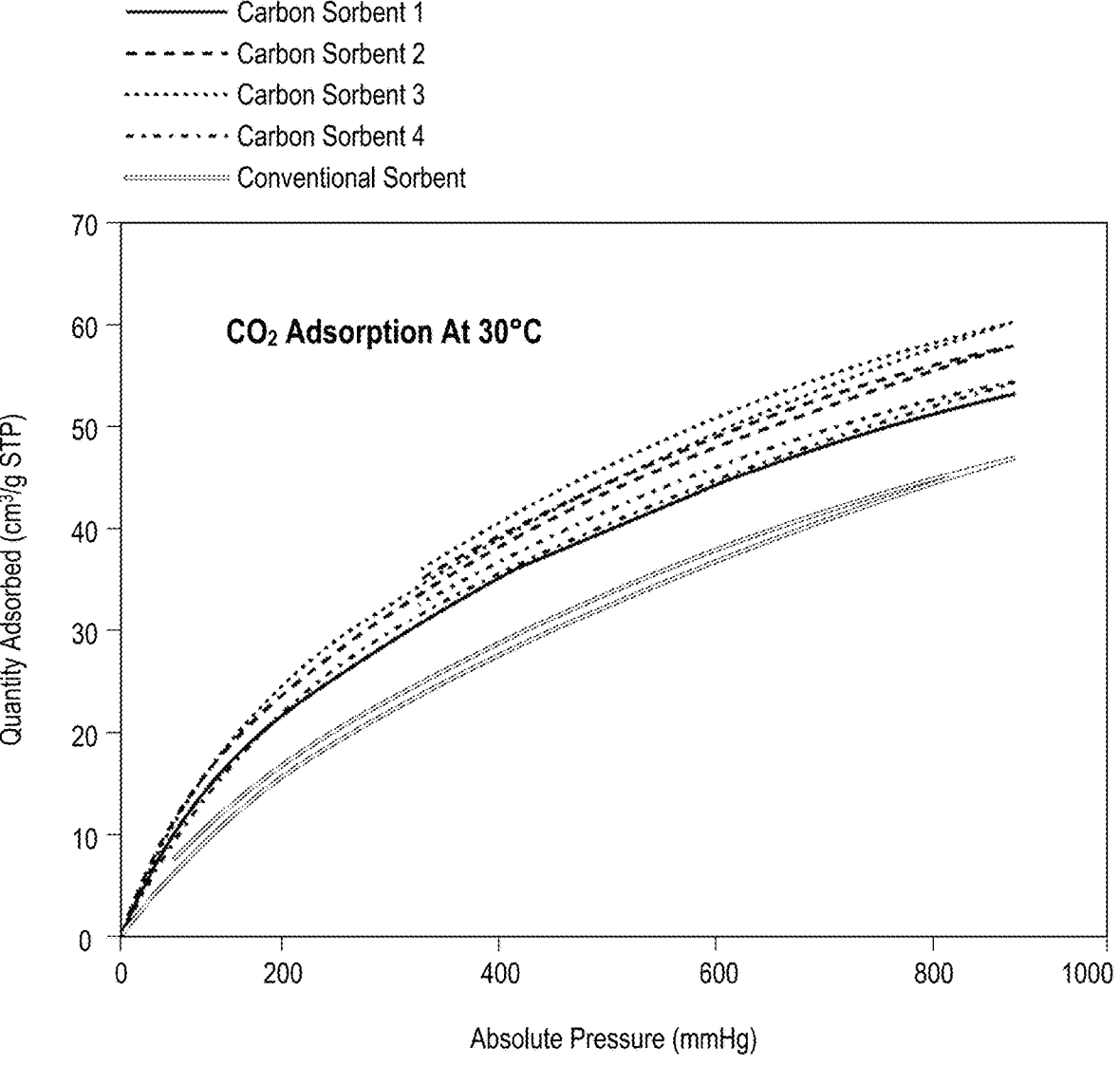
FIG. 9 is a graph illustrating the $CO_2$ adsorption isotherm of various carbon sorbents at 30° C.

FIG. 9 is a graph illustrating the $CO_2$ adsorption isotherm of carbon sorbents 1-4 compared to the conventional carbon sorbent at 30° C. As shown in FIG. 9, carbon sorbents 1-4 exhibited a higher $CO_2$ adsorption capacity than the conventional sorbent. Carbon sorbent 3 exhibited a higher $CO_2$ adsorption capacity than the other carbon sorbents.

Surfaces of carbon sorbents 5-8 were analyzed using X-ray photoelectron spectroscopy (XPS) to determine the elemental composition on the surface of the carbon sorbents. The measured elemental composition on the surface of the carbon sorbents was exclusive of hydrogen (e.g., the XPS cannot detect hydrogen). Table 3 below shows the elemental composition of the surface of carbon sorbents 5-8 exclusive of hydrogen. As shown in Table 3, carbon sorbents 7 and 8, which were formed with a higher amount of the nitrogen-containing material, included a higher atomic percent of nitrogen at the surface than carbon sorbents 5 and 6. An atomic percent of oxygen at the surface of the carbon sorbents was at least 3.5 atomic percent.

TABLE 3

| Carbon Sorbent | C (at. %) | N (at. %) | O (at. %) |
|---|---|---|---|
| 5 | 93.7 | 2.5 | 3.8 |
| 6 | 92.9 | 2.3 | 4.8 |
| 7 | 91.7 | 4.3 | 4.0 |
| 8 | 87.9 | 7.4 | 4.7 |

In addition to XPS, an elemental analysis was performed on each of carbon sorbents 5-8. The elemental analysis measured the weight percent of ash, carbon, hydrogen, and nitrogen in the carbon sorbents. The weight percent of oxygen was determined by subtraction. Prior to performing the elemental analysis, the carbon sorbents were dried under vacuum at 100° C. for two hours. The results of the elemental analysis are shown in Table 4 below. With reference to Tables 3 and 4, the elemental analysis appears to agree with the composition determined by XPS.

TABLE 4

| Carbon Sorbent | Ash (wt. %) | C (wt. %) | H (wt. %) | N (wt. %) | O (wt. %) |
|---|---|---|---|---|---|
| 5 | 0.31 | 89.5 | 1.85 | 2.57 | 5.74 |
| 6 | 0.38 | 88.6 | 1.89 | 2.76 | 6.36 |
| 7 | 0.35 | 84.8 | 1.83 | 7.00 | 6.02 |
| 8 | 0.14 | 82.4 | 1.75 | 9.30 | 6.41 |

The relative compositions of the oxygen species, the carbon species, and the nitrogen species on the surface of carbon sorbents 5-8 were measured using XPS and are shown in Tables 5-7 below. Table 5 shows the type of covalent bonds formed by the oxygen atoms of the oxygen species on the surface of the carbon sorbents. In Table 5, O—C represents the percent of oxygen bonds on the surface of the carbon sorbent that were oxygen to carbon single bonds; and O═C represents the percent of oxygen bonds on the surface of the carbon sorbent that were oxygen to carbon double bonds.

TABLE 5

| Carbon Sorbent | O—C (at. %) | O═C (at. %) |
|---|---|---|
| 5 | 75.1 | 24.9 |
| 6 | 72.9 | 27.1 |
| 7 | 69.9 | 30.1 |
| 8 | 67.8 | 32.2 |

It is believed that the carbon to oxygen double bonds are primarily a mixture of pyrone and pyridone groups. With reference to Table 5, greater than about 65.0 percent of the oxygen bonds at the surface of the carbon sorbents oxygen to carbon single bonds and less than about 35.0 percent of the oxygen bonds are oxygen to carbon double bonds.

Table 6 below shows the percent of carbon bonds that are covalently bonded to different atoms on the surface of the carbon sorbents. In Table 6, C—C, C—H, C—O, and C—N represent carbon atoms single bonded to carbon, hydrogen, oxygen, and nitrogen, respectively; C—O and N═C respectively represent a carbon atom double bonded to an oxygen atom or a carbon atom double bonded to nitrogen atom; O—C═O and N—C═O represent a carbon atom double bonded to oxygen and single bonded to either another oxygen atom or a nitrogen atom, respectively; and pi-pi represents the atomic percent of carbon atoms on the surface of the carbon sorbent that are conjugated (and account for carbon to carbon double bonds).

TABLE 6

| Carbon Sorbent | C—C, C—H (%) | C—O, C—N (%) | C—O, N═C (%) | O—C═O, N—C═O (%) | pi-pi (%) |
|---|---|---|---|---|---|
| 5 | 58.9 | 20.7 | 8.6 | 2.6 | 9.2 |
| 6 | 62.8 | 16.9 | 8.7 | 2.4 | 9.3 |
| 7 | 50.9 | 26.2 | 10.4 | 2.8 | 9.7 |
| 8 | 47.8 | 28.1 | 11.1 | 3.1 | 9.8 |

In Table 6, each row adds up to about 100 percent, meaning that for every about 100 carbon bonds or carbon species, the carbon sorbent exhibited the percentage of the noted carbon bonds or structures. It will be noted that the column that includes O—C=O and N—C=O bonds does not include carbon atoms that are double bonded to an oxygen atom wherein the carbon atom is not also single bonded to another oxygen atom or a nitrogen atom (e.g., carbon atoms that are double bonded to an oxygen atom and single bonded to another carbon atom), as such carbon bonds are accounted for in the column including C=O and N=C bonds. As shown in Table 6, less than about 65.0 percent of the carbon bonds of the carbon sorbent were carbon to hydrogen or carbon to carbon single bonds. Greater than about 15.0 percent, such as greater than about 20.0 percent of the carbon bonds were carbon to oxygen single bonds or carbon to nitrogen single bonds. Greater than about 8.0 atomic percent of the carbon bonds were carbon to oxygen double bonds or carbon to nitrogen double bonds. In addition, greater than about 2.0 atomic percent (e.g., greater than about 3.0 atomic percent) of the carbon bonds on the surface of the carbon sorbents were carbon to oxygen double bonds wherein the carbon atom was also single bonded to another oxygen atom or a nitrogen atom. More than 9.0 percent of the carbon bonds were π-bond conjugated bonds.

Table 7 shows the types of covalent bonds of the nitrogen species on the surface of the carbon sorbents. The carbon sorbents showed no evidence of quaternary or oxidized nitrogen and each included a mixture of pyridone/pyrrole and pyridine type carbon to nitrogen single bonds. Greater than about 40.0 atomic percent and less than about 50.0 atomic percent of the nitrogen species were pyridone and/or pyrrole structures and greater than about 50.0 atomic percent and less than about 60.0 atomic percent of the nitrogen species were pyridine structures.

TABLE 7

| Carbon Sorbent | Pyridone and/or Pyrrole (at. %) | Pyridine (at. %) |
|---|---|---|
| 5 | 47.4 | 52.6 |
| 6 | 45.6 | 54.4 |
| 7 | 44.4 | 55.6 |
| 8 | 40.4 | 59.6 |

Table 8 shows the $CO_2$ capacity of the carbon sorbents, which was measured by exposing the carbon sorbents to a gas stream including 15 volume percent $CO_2$ and 85 volume percent nitrogen gas ($N_2$) at 30° C. and 60° C. The $CO_2$ capacity of carbon sorbents 3 and 4 at 60° C. was not measured. In Table 8, the partial pressure of $CO_2$ was about 114 mmHg and the partial pressure of $N_2$ was about 646 mmHg. With reference to Table 8, the carbon sorbents exhibited a $CO_2$ capacity greater than about 3.0 weight percent at 30° C. when exposed to a gas stream having a $CO_2$ partial pressure of about 114 mmHg. A difference between the $CO_2$ capacity at 60° C. and 30° C. was greater than 2.0 for carbon sorbents 6, 7, and 8.

TABLE 8

| Carbon Sorbent | $CO_2$ Capacity (wt. %) 114 mmHg $CO_2$ (30° C.) | $CO_2$ Capacity (wt. %) 114 mmHg $CO_2$ (60° C.) |
|---|---|---|
| 1 | 3.41 | 1.74 |
| 2 | 3.72 | 1.98 |
| 3 | 3.79 | 1.51 |
| 4 | 3.39 | 1.43 |
| 5 | 3.20 | 1.27 |
| 6 | 4.04 | 1.66 |
| 7 | 3.61 | 1.44 |
| 8 | 3.95 | 1.73 |

Table 9 shows the water loading of carbon sorbents 1-4. The water loading was measured by exposing the carbon sorbents to a stream having the noted relative humidity at the noted temperatures and measuring the amount of water adsorbed. With reference to Table 9, the carbon sorbents exhibited negligible water loading at 0° C. and 25% relative humidity and a relatively low water loading at 25° C. and a 25% relative humidity. In addition, the water loading at 50% relative humidity and 0° C. and 25° C. was relatively lower than the water loading of conventional carbon sorbents, which is often greater than about 10.0, such as greater than about 15.0.

TABLE 9

| Carbon Sorbent | Water Loading wt. % 25% RH (0° C.) (1.18 mmHg water) | Water Loading wt. % 25% RH (25° C.) (6.0 mmHg water) | Water Loading wt. % 50% RH (0° C.) (2.36 mmHg water) | Water Loading wt. % 50% RH (25° C.) (12.17 mmHg water) |
|---|---|---|---|---|
| 1 | 0.0 | 0.16 | 6.37 | 6.05 |
| 2 | 0.0 | 0.02 | 4.74 | 6.91 |
| 3 | 0.0 | 0.45 | 4.79 | 6.95 |
| 4 | 0.0 | 0.04 | 6.24 | 6.59 |

Table 10 shows the LAST selectivity of the carbon sorbents to $CO_2$ relative to $N_2$ at 30° C. and 60° C. for carbon sorbents 5-8. The selectivity was measured by exposing the carbon sorbents to a gas including 15 volume percent carbon dioxide and 85 volume percent nitrogen gas. The $CO_2$ exhibited a partial pressure of 114 mmHg and the $N_2$ exhibited a partial pressure of 646 mmHg. The carbon sorbents exhibited a selectivity of $CO_2$ relative to $N_2$ greater than about 19.00 at 60° C. and greater than 20.00 at 30° C. These examples demonstrate that the addition of nitrogen to the formulation increased the selectivity of $CO_2$ over $N_2$.

TABLE 10

| Carbon Sorbent | IAST selectivity of $CO_2$ relative to $N_2$ at 30° C. | IAST selectivity of $CO_2$ relative to $N_2$ at 60° C. |
|---|---|---|
| 1 | 13.23 | 11.19 |
| 2 | 13.11 | 11.57 |
| 3 | 13.05 | 12.54 |
| 4 | 13.76 | 11.47 |
| 5 | 20.87 | 19.30 |
| 6 | 21.60 | 21.23 |
| 7 | 23.79 | 22.81 |
| 8 | 27.85 | 25.95 |

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A mesoporous carbon sorbent for removal of carbon dioxide from a gaseous material, the carbon sorbent comprising:
   a Barrett-Joyner-Halenda (BJH) average pore width greater than about 25 nm; and
   a selectivity of carbon dioxide to nitrogen greater than about 20.00 at about 30° C., a partial pressure of carbon dioxide of about 114 mmHg, and a partial pressure of nitrogen of about 646 mmHg;
   wherein the mesoporous carbon sorbent includes greater than about 1.0 atomic percent nitrogen.

2. The mesoporous carbon sorbent of claim 1, wherein greater than about 8.0 percent of carbon bonds of the mesoporous carbon sorbent are one of carbon to oxygen double bonds or carbon to nitrogen double bonds.

3. The mesoporous carbon sorbent of claim 1, the selectivity of carbon dioxide to nitrogen of the mesoporous carbon sorbent is greater than about 19.00 at about 60° C.

4. The mesoporous carbon sorbent of claim 1, wherein the mesoporous carbon sorbent exhibits a water loading of 0.50 weight percent at about 25° C. and about 6.09 mmHg.

5. The mesoporous carbon sorbent of claim 1, wherein the mesoporous carbon sorbent includes from about 1.0 atomic percent to about 5.0 atomic percent oxygen.

6. The mesoporous carbon sorbent of claim 1, wherein the mesoporous carbon sorbent includes greater than about 3.5 atomic percent oxygen.

7. The mesoporous carbon sorbent of claim 1, wherein the mesoporous carbon sorbent exhibits a carbon dioxide capacity within a range of from 3.00 weight percent to about 4.50 weight percent when exposed to a partial pressure of carbon dioxide of about 114 mmHg at about 30° C.

8. The mesoporous carbon sorbent of claim 1, wherein the mesoporous carbon sorbent has a t-plot micropore volume greater than about 0.20 g/cm³.

9. A system for removing carbon dioxide from a gaseous material with a carbon sorbent, the system comprising:
   a sorbent bed comprising a mesoporous carbon sorbent, the mesoporous carbon sorbent comprising:
      at least some nitrogen;
      a Barrett-Joyner-Halenda (BJH) mesopore pore volume of at least about 0.20 cm³/g; and
      a BJH average pore width greater than about 25 nm,
      wherein the mesoporous carbon sorbent includes greater than about 1.0 atomic percent nitrogen; and
      wherein the mesoporous carbon sorbent exhibits a selectivity of carbon dioxide to nitrogen greater than about 20.00 at about 30° C. and a partial pressure of carbon dioxide of about 114 mmHg, the mesoporous carbon sorbent exhibiting a water loading less than about 0.50 weight percent at about 25° C. and a relative humidity of about 25 percent.

\* \* \* \* \*